(12) United States Patent
Ma et al.

(10) Patent No.: US 12,205,058 B2
(45) Date of Patent: *Jan. 21, 2025

(54) SYSTEMS AND METHODS FOR IDENTIFYING PROCESSES FOR ROBOTIC AUTOMATION AND BUILDING MODELS THEREFOR

(71) Applicant: TUNGSTEN AUTOMATION CORPORATION, Irvine, CA (US)

(72) Inventors: Jiyong Ma, San Diego, CA (US); Stephen Michael Thompson, Oceanside, CA (US); Jan W. Amtrup, Silver Spring, MD (US)

(73) Assignee: TUNGSTEN AUTOMATION CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,580

(22) Filed: Oct. 10, 2023

(65) Prior Publication Data

US 2024/0046180 A1 Feb. 8, 2024

Related U.S. Application Data

(63) Continuation of application No. 17/674,714, filed on Feb. 17, 2022, now Pat. No. 11,836,662, which is a
(Continued)

(51) Int. Cl.
*G06F 3/01* (2006.01)
*G06F 18/23213* (2023.01)
*G06Q 10/0633* (2023.01)

(52) U.S. Cl.
CPC ............ *G06Q 10/0633* (2013.01); *G06F 18/23213* (2023.01)

(58) Field of Classification Search
CPC .......... G06Q 10/0633; G06Q 10/06398; G06F 18/23213; G06F 2201/81; G06F 2201/86; G06F 11/3438; G06F 11/3476
See application file for complete search history.

(56) References Cited

U.S. PATENT DOCUMENTS 5,680,192 A * 10/1997 Burrell ................. G02F 1/1345
349/149
6,668,072 B1 * 12/2003 Hribernig .......... G06V 40/1365
382/284
(Continued)

FOREIGN PATENT DOCUMENTS

WO WO-2018209524 A1 * 11/2018

*Primary Examiner* — Howard D Brown, Jr.
(74) *Attorney, Agent, or Firm* — Zilka-Kotab, P.C.

(57) ABSTRACT

According to one aspect, a computer-implemented method of discovering processes for robotic process automation (RPA) includes: recording a plurality of event streams, each event stream corresponding to a human user interacting with a computing device to perform one or more tasks; concatenating the event streams; segmenting some or all of the concatenated event streams to generate one or more application traces performed by the user interacting with the computing device, each application trace corresponding to one of the one or more tasks performed by the user; clustering the traces according to a task type; identifying, from among some or all of the clustered traces, one or more candidate processes for robotic automation; prioritizing the candidate processes; and selecting at least one of the prioritized candidate processes for robotic automation. Corresponding systems and computer program products are also described.

20 Claims, 4 Drawing Sheets

Related U.S. Application Data continuation of application No. 16/387,269, filed on Apr. 17, 2019, now Pat. No. 11,281,936.

(60) Provisional application No. 62/787,136, filed on Dec. 31, 2018.

(56) References Cited

U.S. PATENT DOCUMENTS

| | | |
|---|---|---|
| 11,551,167 B2 * | 1/2023 | Monovich .............. G06Q 10/20 |
| 11,836,662 B2 * | 12/2023 | Ma ...................... G06F 11/3476 |
| 2010/0305986 A1 * | 12/2010 | Ponnalagu ............. G06Q 10/06 705/7.11 |
| 2011/0246881 A1 * | 10/2011 | Kushman ................ G06F 9/453 715/708 |
| 2012/0077178 A1 * | 3/2012 | Bagchi .................... G09B 7/00 434/362 |
| 2018/0113780 A1 * | 4/2018 | Kim ........................ G06F 9/451 |
| 2019/0324891 A1 * | 10/2019 | Mola .................. G06F 11/3636 |
| 2020/0206920 A1 * | 7/2020 | Ma ..................... G06Q 10/0633 |
| 2024/0046180 A1 * | 2/2024 | Ma .................... G06F 18/23213 |

* cited by examiner

SYSTEMS AND METHODS FOR IDENTIFYING PROCESSES FOR ROBOTIC AUTOMATION AND BUILDING MODELS THEREFOR

PRIORITY CLAIM

The present application is a continuation of U.S. patent application Ser. No. 17/674,714, filed Feb. 17, 2022, and entitled "Systems And Methods For Identifying Processes For Robotic Automation And Building Models Therefor," which is a continuation of U.S. patent application Ser. No. 16/387,269, filed Apr. 17, 2019 and entitled "Systems And Methods For Identifying Processes For Robotic Automation And Building Models Therefor," which claims priority to U.S. Provisional Patent Application No. 62/787,136, filed Dec. 31, 2018 and entitled "Process Mining for Discovery of Robotic Process Automation Opportunities and Building Models for Robotic Process Automation", to each of which priority is claimed, and the contents of each of which are herein incorporated by reference.

FIELD OF INVENTION

The present invention relates to process automation, and more specifically, this invention relates to systems and methods for identifying processes for robotic automation (also known, and referred to herein as "robotic process automation" or "RPA") building models to improve the efficiency of tasks typically performed manually by a user interacting with a device such as a computer, tablet, smartphone, personal digital assistant, etc.

BACKGROUND

Robotic Process Automation (RPA) is an emerging field of intelligent automation that seeks to improve the efficiency of performing repetitive tasks. Existing work in this field is primarily human-driven in that the tasks to be performed are expressly defined by a project leader, system administrator, engineer, etc. From this manually-defined workflow, an algorithm is developed to handle the various portions of the overall task, relieving human users from the burden of repetitively performing the task.

While conventional RPA has advanced with respect to the manner in which inputs may be detected and analyzed, conventional techniques do not provide solutions for the problem of delineating between different tasks performed throughout a given period of time, analyzing those tasks to determine different sequences of actions taken by numerous users, and identifying processes for automating tasks based on the identified tasks and users' solutions thereto.

Nor do current RPA technologies enable building suitable models to automate the tasks identified as processes for increasing performance efficiency within the enterprise.

Accordingly, it would be useful to provide systems, methods, and computer program products capable of analyzing recorded user interactions with computing devices to identify various tasks performed by the users over long periods of time and with large numbers of different users' interactions corresponding to a set of tasks performed repeatedly within an enterprise.

Furthermore it would be beneficial to analyze the recorded interactions to identify different sequences of actions taken by the users to accomplish each type of task, and optimize among the various potential solutions and generate a model for more efficient performance of identified valuable automation opportunities/tasks.

SUMMARY

In one approach, a computer-implemented method of identifying one or more processes for robotic automation (RPA) includes: recording a plurality of event streams, each event stream corresponding to a human user interacting with a computing device to perform one or more tasks; concatenating the event streams; segmenting some or all of the concatenated event streams to generate one or more individual traces performed by the user interacting with the computing device, each trace corresponding to a particular task; clustering the traces according to a task type; identifying, from among some or all of the clustered traces, one or more candidate processes for robotic automation; prioritizing the candidate processes; and selecting at least one of the prioritized candidate processes for robotic automation.

In another implementation, a computer program product for discovering processes for robotic process automation (RPA) includes a computer readable storage medium having program instructions embodied therewith. The computer readable storage medium is not a transitory signal per se, and the program instructions are executable by a processor to cause the processor to: record a plurality of event streams, each event stream corresponding to a human user interacting with a computing device to perform one or more tasks; concatenate the event streams; segment some or all of the concatenated event streams to generate one or more individual traces performed by the user interacting with the computing device, each trace corresponding to a particular task; cluster the traces according to a task type; identify, from among some or all of the clustered traces, one or more candidate processes for robotic automation; prioritize the candidate processes; and select at least one of the prioritized candidate processes for robotic automation. The segmenting comprises splitting the concatenated event streams into a plurality of application traces, each application trace comprising a sequence of one or more events performed within a same application, and the program instructions are further configured to cause the processor to: cluster the plurality of application traces according to the sequence of the one or more events performed within each respective application trace; label each of the plurality of application traces to form a plurality of sequences of labels, wherein the labeling is performed according to the cluster to which the respective application trace is assigned; and identify one or more recurring subsequences of labels within the plurality of sequences of labels, the one or more recurring subsequences having a length at least as long as a predefined large subsequence length L.

In yet another aspect, a computer program product for discovering processes for robotic process automation (RPA) includes a computer readable storage medium having program instructions embodied therewith. The computer readable storage medium is not a transitory signal per se, and the program instructions are executable by a processor to cause the processor to: record a plurality of event streams, each event stream corresponding to a human user interacting with a computing device to perform one or more tasks; concatenate the event streams; segment some or all of the concatenated event streams to generate one or more individual traces performed by the user interacting with the computing device, each trace corresponding to a particular task; cluster the traces according to a task type; identify, from among some or all of the clustered traces, one or more candidate processes for robotic automation, wherein the one or more processes for robotic automation are identified based at least in part on: a frequency of one or more variants of the clustered traces included in each cluster; and an aggregate weight associated with performing the particular task to which the clustered traces correspond; and wherein the aggregate weight comprises: a number of person-hours expended by humans performing the particular task to which the clustered traces correspond over a predetermined amount of time; an amount of computational resources consumed by humans performing the particular task to which the clustered traces correspond over the predetermined amount of time; and/or an amount of financial resources expended while humans perform the particular task to which the clustered traces correspond over a predetermined amount of time; prioritize the candidate processes; and select at least one of the prioritized candidate processes for robotic automation.

In still yet another aspect, a computer-implemented method of discovering processes for robotic process automation (RPA) includes: recording a plurality of event streams, each event stream corresponding to a human user interacting with a computing device to perform one or more tasks; concatenating the event streams; segmenting some or all of the concatenated event streams to generate one or more application traces performed by the user interacting with the computing device, each application trace corresponding to one of the one or more tasks performed by the user; clustering the traces according to a task type; identifying, from among some or all of the clustered traces, one or more candidate processes for robotic automation; prioritizing the candidate processes; and selecting at least one of the prioritized candidate processes for robotic automation.

Other aspects and implementations of the present invention will become apparent from the following detailed description, which, when taken in conjunction with the drawings, illustrate by way of example the principles of the invention.

DETAILED DESCRIPTION

Figure 1:
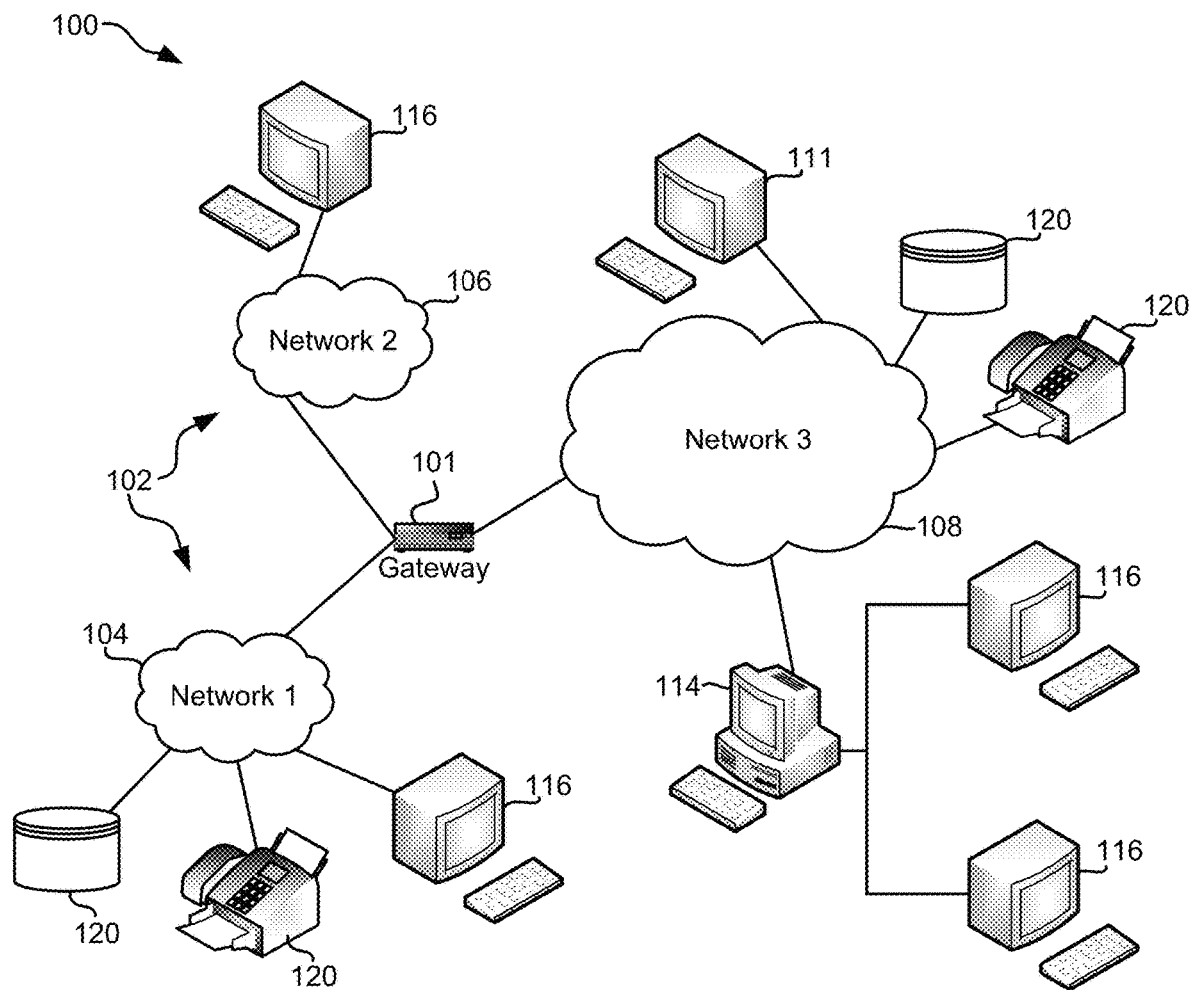
FIG. 1 illustrates a network architecture, in accordance with one implementation of the presently disclosed inventive concepts.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest reasonable interpretation including meanings implied from the specification as well as meanings understood by those skilled in the art and/or as defined in dictionaries, treatises, etc.

Definitions

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "about" and "approximately" shall be understood as referring to a correspondingly stated value, and any values within ±10% of the stated value. For example, "about 10" shall be understood as including all values in the range from 9 to 11, inclusively.

Unless otherwise expressly stated herein, a "task" in the context of robotic process automation (RPA) is to be understood as referring to an objective typically performed by a human interacting with a computing device such as a desktop, laptop, tablet, smartphone, etc. that must be accomplished on a recurring basis. In various implementations, there are multiple ways to accomplish a given task, limited only by the manner in which the user may interact with the computing device.

Exemplary "tasks" in accordance with the present descriptions may include, without limitation, data entry, customer service interactions (e.g. chat sessions, call center interactions), business transactions (e.g. invoice processing, product acquisition, sales, new account processing, etc.), performing processing workflows of any type (e.g. image processing, data analytics, statistical analyses, etc.) or any other type of human/computer interaction that may be represented by a human interacting with one or more user interfaces (UIs) of a computing device.

An "event stream" as referenced in the present disclosure is a recorded sequence of UI actions (e.g. mouse clicks, keyboard strokes, interactions with various elements of a graphical user interface (GUI), auditory input, eye movements and/or blinks, pauses, gestures (including gestures received/input via a touchscreen device, as well as gestures performed in view of a camera, e.g. for VR applications), etc.) and/or associated device actions (e.g. OS actions, API calls, calls to data source(s), etc.) for a particular user over a particular time period. In preferred implementations, an "event stream" may also include contextual information associated with the user's interactions, such as an identity of the user, various data sources relied upon/used in the course of the user's interactions, content of the computing device's display, including but not limited to content of a particular window, application, UI, etc., either in raw form or processed to revel, for instance, key-value pairs, and/or other elements displayed on the screen, particularly contextual information such as the window/application/UI/UI element, etc. upon which the user is focused; time of day at which various interactions are performed, one or more "groups" with which the user is associated (e.g. a project name, a workgroup, a department of the enterprise, a position or rank of the user, various permissions associated with the user, etc.), an identification of a device, operating system, application, etc. associated with the user performing various interactions within the event stream, or any other relevant contextual information that may be provided by the computing device during the course of the event stream, whether such information is directly or indirectly related to input provided by the user, as would be understood by a person having ordinary skill in the art upon reading the present disclosures.

For instance, in various approaches relevant contextual information may include information displayed on a monitor or other display means of the computing device, particularly information in a window or application with which the user is currently interacting or has most recently interacted, e.g. a window or application, etc. upon which the user/device is/are "focused" may provide useful contextual information. In one example, after the user action "click on look up country code" the system displays the country code on some part of the screen, and the user then uses this information to decide whether to click international or domestic shipping. In order to automate this process, the means for identifying the displayed country code is preferably recoverable from the recorded data (e.g. via location in a text box), such that a robot implementing these operations can then inspect that location (or use any other suitable means of extracting the desired information that would be appreciated by a person having ordinary skill in the art upon reading the present disclosure) in order to automatically decide which button to click next.

"Event streams" may be conceptualized as a series of events, where each "event" includes any suitable number or combination of UI actions within an event stream. For example, in one approach an event may include a particular keystroke, mouse click, or combination thereof performed within a given application running on a computing device. One concrete example would be a left mouse click while a particular key, such as Control, Shift, Alt, etc. is depressed and the computing device is "focused" on a spreadsheet application. Similarly, the meaning of a keypress "enter" depends upon the application/window/UI element upon which a user is focused, e.g. pressing the "enter" key when an application icon is selected may launch the application, while pressing "enter" when focused on a cell of a spreadsheet may cause a function to be executed or value entered into the cell. Accordingly, such events may indicate to perform a certain operation on a certain data value represented within a table or other data structure. Preferably, "events" refer to a single point in time (or small window of time, e.g. less than one second or an amount of time required to perform a more complex action such as a double-click, gesture, or other action that is defined by multiple related inputs intended to be interpreted as a single input), along with the associated interactions and/or device actions occurring at the given point in time. In all cases, where an event encompasses multiple user interactions, device actions, etc., these are contiguous interactions, actions, etc. forming a single linear sequence.

As utilized herein, the term "segment" shall be understood as referring to a particular sequence of events within an event stream. A segment, in various approaches, may include any portion of an event stream, and may or may not involve contiguous events within the course of a given event stream, in various approaches. Preferably, segments comprise contiguous events within the course of a given event stream, as non-contiguous segments may be prone to including irrelevant or unrelated operations, e.g. where the user switches between tasks temporarily or is distracted and takes an irrelevant action in the course of an otherwise singularly focused event stream.

It is important to note that the object of the presently described inventive concepts is not to exhaustively capture all device/user interactions and associated device actions (e.g. OS actions, API calls, etc. typically transparent to the user) occurring as part of any given event stream. Similarly, it is not necessarily an object of the inventive concepts presented herein to identify particular values input by a user or process in the performance of a given task. Rather, the inventive concepts presented herein seek to identify a critical set of interactions and/or and device actions associated with various possible ways to successfully perform a given task, and to also discover the tasks that are being performed and corresponding automated processes for performing such tasks with improved performance. System administrators and policymakers are typically aware of what the users do on a certain level of abstraction, but often not detailed enough to know what all the small tasks are, how frequently these occur, and how much efficiency may be improved (and weight saved) by automating such small tasks.

Preferably based on a critical, often minimal, set of interactions, "traces" are built, in accordance with the inventive concepts described herein. A "trace" is to be understood as a segment that accomplished a particular task in a particular instance. Visually, and as described in greater detail below with reference to FIG. 3, a "trace" is analogous to a path from one end of a directed graph to another end of the graph, where each point along the path represents an event.

The present descriptions refer to an "application trace" as a maximal segment of events taken within the same application. Preferably, events within an "application trace" will correspond to or form part of an overall trace, but in certain implementations (e.g. involving SAP interfaces, CITRIX applications, and other similar virtualized environments, etc.) an application trace may refer to an overall host interface, service, or application within which a user performs tasks.

As referred to herein, the term "element" shall be understood as referencing any portion of a UI hierarchy with which a user may interact and/or which may be involved (such as API calls) in a user interaction with a computing device, as described in greater detail herein below. For example windows, panes, buttons, dialog boxes, combo boxes, menus, fields, icons, links, and associated hierarchical features/elements within a UI are all exemplary forms of "elements" as described herein. Of course, skilled artisans will appreciate that any other type of element of a UI with which a user may interact may be employed without departing from the scope of the presently disclosed inventive concepts.

As utilized herein, the term "cluster" shall be understood as a set of traces that represent different instances of successfully performing the same task. Accordingly, the traces forming a given cluster may or may not involve different events, segments, and/or application traces, while any given trace in a cluster may represent one of any number of event streams, e.g. where one or more users perform the task in the same manner over time.

Accordingly, the term "variant" shall be understood as referring to a unique way in which a given task can be achieved. Multiple identical traces represent a single variant, and increase the "weight" or "volume" of the variant in accordance with the inventive concepts presented herein.

A "robot" or "software robot" as referenced herein is a set of instructions capable of being executed using a computing device, and which correspond to a sequence of user/device interactions and associated actions (preferably corresponding to at least one segment, and most preferably corresponding to at least one trace) of a task substantially as-performed by a human interacting with the computing device. By "substantially," it shall be understood that a software robot performs at least a critical subset, but not necessarily all, actions as the user performs in carrying-out the task. For example, a software robot may omit repetitive actions, actions which have no impact on the state of the application/UI/etc., erroneous actions such as data entry that is subsequently removed, irrelevant actions, etc. Moreover the software robot may combine a series of individual actions into a single action, e.g. robots don't necessarily need to provide input such as clicks and keypresses, e.g. to activate an application the software robot can simply use the appropriate API call. Similarly, when working with a web page, document, or other data source a human may need to scroll or navigate along the UI to locate desired content, while a robot doesn't need to "see" the content to activate or manipulate it because it has the whole data structure (e.g. HTML document, XML table, etc.) in memory. Accordingly, while the software robot will perform all actions necessary to accomplish the task, the software robot may not perform the identical trace followed by any given user performing the same task manually. In this manner, the presently described inventive concepts convey improved efficiency to tasks generally performed by humans using a computer, and improve the overall function of the corresponding enterprise. Accordingly, software robots as described herein shall be understood as conveying improvements to the function of a computer by freeing the system from dependence/reliance upon user input to perform automatable tasks. For instance, by not having to wait for user input, the software robot may act immediately upon completion of each event and proceed to the next event, while a UI without any such robotic process automation must await human input in order to proceed at each, or at least many, steps of the process. Similarly, by omitting unnecessary steps/events while performing the tasks the computer implementing the task conserves associated storage space and computational resources while accomplishing the ultimate goal in less time than even the most efficient human expert.

As described herein, "software robots" are to be distinguished from: physical robots; scripts; and other set of computer-readable and/or executable instructions that may be used by a computer to perform a predefined sequence of operations. Moreover, software robots are configured to perform the same tasks on different data sources without requiring any additional configuration unique to the individual data source. Software robots may be invoked manually, or automatically, e.g. according to a schedule, in response to various predetermined trigger conditions such as loading a particular application or accessing a particular data set, etc. according to several illustrative approaches.

In various contexts and as described in greater detail hereinbelow, use of software robots represent an improvement to the function of computer-based systems by identifying tasks that would be more efficiently performed in an automated fashion rather than manually and repeatedly being performed by human users. By identifying the most efficient manner of performing a given task, overall system resources (such as data storage, compute resources, I/O overhead, bandwidth consumption, etc.) consumed in association with performing such tasks is reduced and available for other use. Moreover, the inventive software robots presented herein accomplish tasks more efficiently without sacrificing quality of results because the robots perform an even more efficient sequence of actions/events to accomplish a task than any given user or set of users, in aggregate, perform the particular task.

For instance, as noted above robots omit irrelevant, erroneous, and/or repetitive actions, software robots consume less computational resources and require fewer steps to accomplish a task. Moreover, software robots may improve upon the efficiency of task performance in ways not capable of being accomplished by a human, e.g. for a user interface with elements that requires a human user's to visual inspection and/or interaction for activation (e.g. a button, a link, a field, etc.), the user must scroll to the appropriate location, locate the element, and perform the appropriate interaction. On the other hand, the software robot has direct access to the element upon loading the user interface into memory, and need not perform any such scrolling or inspection operations. Similarly, robots may combine sequences of events performed by users, e.g. data entry, into single compound events more efficient than the sequence of individual events.

In addition, by identifying processes for automating repetitive, often hidden tasks (such as migrating a data source from remote storage to an active workstation or repository, processing images to extract information therefrom using a predefined workflow, application, or tool, etc.), the inventive concepts presented herein represent an improvement to other technical fields by reducing the amount of person-hours devoted to repetitive tasks, freeing professionals to spend time on more appropriate tasks for human performance, such as creative problem solving, direct human interaction, etc.

Keeping the foregoing definitions in mind, the following description discloses several preferred implementations of systems, methods and computer program products for identifying processes for robotic process automation, and building robotic process automation models to improve the efficiency of tasks typically performed manually by a user interacting with a device such as a computer, tablet, smartphone, personal digital assistant, etc.

Without limitation, the inventive efforts represented by the present disclosure seek to solve problems existing with conventional approaches to robotic process automation. These include all such challenges described herein, among others that will be appreciated by a person having ordinary skill in the art upon reading the present specification and reviewing the various figures.

For instance, discovering processes for robotic automation is a complex endeavor. While frequency of performance is generally an important, if not primary, indicator of the value of automating a given task, it is not sufficient to simply automate tasks performed most frequently across an enterprise/project/experiment, etc. Different types of tasks may not lend well to automation, and/or may not represent a substantial drain on productivity. For example, automating a user login process, which every user must perform at least once daily, does not lend well to automation because the individual values that must be entered vary significantly and are sensitive and perhaps should not be available for use in automated processes. Moreover, a user manually performing the secure login hardly causes a drain on overall productivity since the task is very simple, and takes little time/effort to complete. Accordingly, even though performed at least once daily by every user, a user login process is not likely a ripe opportunity for improving overall performance efficiency via robotic process automation.

On the other hand, a more complex but ultimately rote procedure such as invoice processing, asset acquisition, image processing, submitting a work or data processing request, entering data into a repository, converting data from one format to another, etc. may include a suitable set of tasks for automation, depending on the frequency and weight of performance, among other variables that will be appreciated by those having ordinary skill in the art upon reading the present disclosure. The set of tasks may include all or only a portion of all tasks required to complete the overall procedure.

As noted above in the background, identifying tasks, and particularly break-points between one task and another (as opposed to different parts of the same task) is a non-trivial and important aspect of identifying processes for robotic process automation, particularly as the length of an event stream and/or the number of event streams evaluated increase. Moreover, identifying from among various tasks those suitable for automation and which represent an improvement to performance efficiency is important to the functionality of the inventive concepts described herein.

Accordingly, and in general, the presently described inventive concepts include the following illustrative techniques, along with corresponding implementations thereof as systems and/or computer program products.

Operating Environment

Figure 2:
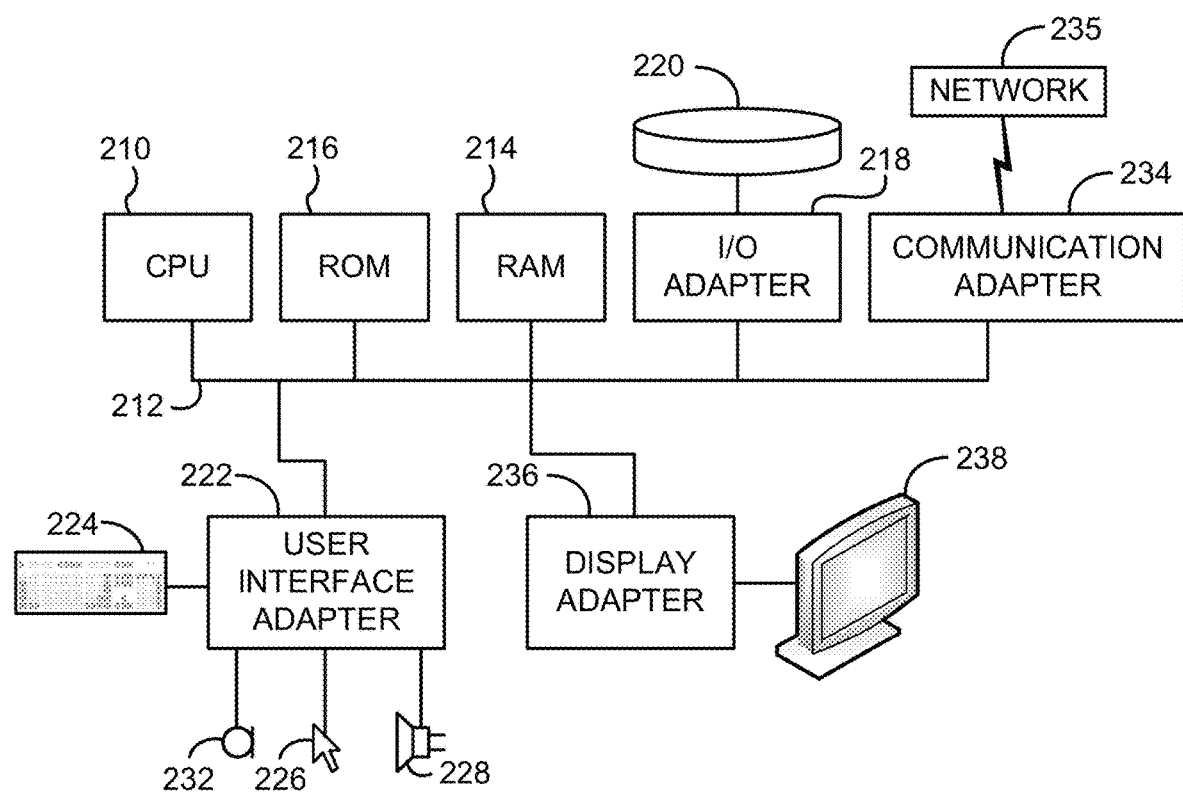
FIG. 2 shows a representative hardware environment that may be associated with the servers and/or clients of FIG. 1, in accordance with one implementation of the presently disclosed inventive concepts.

FIGS. 1 and 2, as described in detail hereinbelow, set forth an exemplary operating environment suitable for implementing the presently described inventive concepts, in accordance with the various approaches and examples disclosed herein. Those having ordinary skill in the art will appreciate that any combination of features described with respect to any given implementation set forth herein may be employed in the context of FIGS. 1 and 2, without limitation and without departing from the scope of the inventive concepts presented herein.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, handheld computer, smartphone, tablet, or other mobile device, printer, multifunction peripheral, or any other type of logic. It should be noted that a user device 116 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some implementations.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as virtual reality googles and/or handheld controllers, a touch screen (e.g. for receiving/detecting gestures) and a digital camera (not shown, but also optionally for receiving/detecting gestures, recording video, etc.) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Identifying Processes for Robotic Automation

Referring again to the specific field of RPA mining, and identifying processes for automation, the presently described inventive concepts principally include two phases—event recording, followed by segmentation and/or clustering, with an optional and preferred intermediate phase involving cleaning and/or normalization therebetween.

In one general approach, a computer-implemented method of identifying one or more processes for robotic automation (RPA) includes: recording a plurality of event streams, each event stream corresponding to a human user interacting with a computing device to perform one or more tasks; concatenating the event streams; segmenting some or all of the concatenated event streams to generate one or more individual traces performed by the user interacting with the computing device, each trace corresponding to a particular task; clustering the traces according to a task type; identifying, from among some or all of the clustered traces, one or more candidate processes for robotic automation; prioritizing the candidate processes; and selecting at least one of the prioritized candidate processes for robotic automation.

In another generalized implementation, a computer program product for discovering processes for robotic process automation (RPA) includes a computer readable storage medium having program instructions embodied therewith. The computer readable storage medium is not a transitory signal per se, and the program instructions are executable by a processor to cause the processor to: record a plurality of event streams, each event stream corresponding to a human user interacting with a computing device to perform one or more tasks; concatenate the event streams; segment some or all of the concatenated event streams to generate one or more individual traces performed by the user interacting with the computing device, each trace corresponding to a particular task; cluster the traces according to a task type; identify, from among some or all of the clustered traces, one or more candidate processes for robotic automation; prioritize the candidate processes; and select at least one of the prioritized candidate processes for robotic automation.

In yet another general aspect, a system for discovering processes for robotic process automation (RPA), includes: a processor; and logic integrated with the processor, executable by the processor, or integrated with and executable by the processor. The logic is configured to cause the processor, upon execution thereof, to: record a plurality of event streams, each event stream corresponding to a human user interacting with a computing device to perform one or more tasks; concatenate the event streams; segment some or all of the concatenated event streams to generate one or more individual traces performed by the user interacting with the computing device, each trace corresponding to a particular task; cluster the traces according to a task type; identify, from among some or all of the clustered traces, one or more candidate processes for robotic automation; prioritize the candidate processes; and select at least one of the prioritized candidate processes for robotic automation.

Of course, additional and/or alternative aspects, features, operations, functions, etc. as described herein may be implemented in the context of the general approaches set forth above, without departing from the scope of the inventive concepts presented herein.

Figure 3:
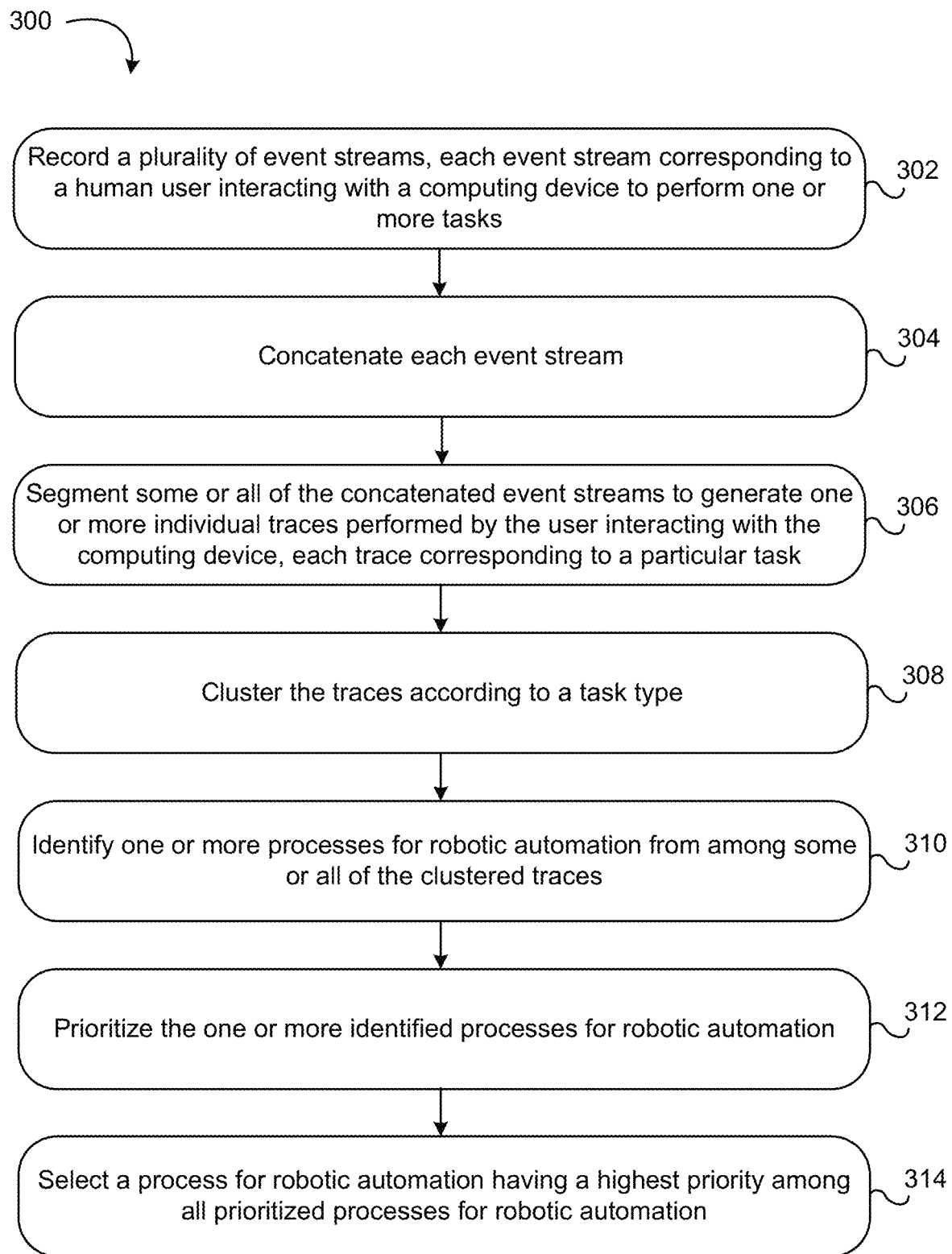
FIG. 3 illustrates a flowchart of a method for discovering processes for robotic automation (RPA), in accordance with one implementation of the presently disclosed inventive concepts.

In one particular implementation, identifying processes for robotic process automation may be performed substantially in accordance with method 300 as shown in FIG. 3. The method 300 may be performed in accordance with the present invention in any of the environments depicted in FIGS. 1-2, among others, in various implementations. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various implementations, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The operations of method 300 will be set forth in summary below, and explained individually thereafter in accordance with various additional and/or alternative details, features, functions, etc. that may be employed in any combination or permutation without departing from the scope of the inventive concepts presented herein. Moreover, the detailed explanations provided following each of operations 302-314 are to be understood as illustrative descriptions of various ways in which the respective operation may be implemented, without limitation and regardless of whether each individual feature expressly refers back to method 300 or the respective operation 302-314. The following descriptions of method 300 are organized to provide guidance as to which aspects of the present disclosure may be included with each respective implementation of the inventive concepts.

Returning now to FIG. 3 in particular, method 300 involves operations 302-314. A plurality of event streams, each event stream corresponding to a human user interacting with a computing device to perform one or more tasks, are recorded in operation 302. In operation 304, event streams are concatenated. At least some, possibly all, of the concatenated event streams are segmented, in operation 306, to generate individual traces each corresponding to a particular task performed by a user interacting with a computing device. In operation 308, such traces are clustered according to task type, and candidate processes for robotic automation are identified from among these clusters in operation 310. To ensure optimal efficiency benefits for the overall task performance, the identified candidate processes are prioritized for purposes of robotic automation in operation 312, and in operation 314 at least one of the prioritized candidate processes is selected for robotic automation. The selected process(es) may or may not be those having the highest priority, in various approaches.

Of course, the foregoing summary of FIG. 3 and method 300 is a simplified description of the various aspects of identifying processes for robotic automation according to the inventive concepts presented herein. Additional details for each operation, which shall be understood as capable of being combined in any suitable manner that would be appreciated by a person having ordinary skill in the art reading the present description, are set forth without limitation below.

Event Recording

As noted above regarding FIG. 3, method 300 may initiate with operation 302, where a plurality of event streams are recorded, each event stream corresponding to a human user interacting with a computing device to perform one or more tasks. The event streams may be recorded using any combination of known techniques such as keylogging, video recording, audio recording, screen recording/snapshots, etc. as would be understood by a person having ordinary skill in the art upon reading the present disclosure. The event streams serve as a source of input for human task performance from which processes for RPA will be identified.

In order to identify tasks, and particularly tasks subject to automation, the inventive concepts described herein include recording user interactions with computing devices over a relatively long period of time in operation 302 of method 300, e.g. yielding event streams lasting substantially an entire work day, without breaks. An exemplary event stream, based on empirical observation and assuming a department of about 20 users, may be expected to include approximately 3,000-5,000 events per individual per day. This yields a monthly total on the order of millions of events, and represents an exemplary data set from which to identify processes for RPA on an enterprise basis, according to the inventive concepts described herein.

Of course, in various approaches the data set may include more (preferably much more) or less (but preferably not) data points, but it should be understood that the efficiency of the resulting robotic process models generally improves with the amount of available data. In any case, the event stream includes user interactions performed via one or more I/O devices interfaced with a computing device, and/or associated events performed by the computing device in response to such interactions, such as API calls, data formatting/encryption/decryption, UI rendering, etc. as would be understood by a person having ordinary skill in the art upon reading the present disclosure.

Accordingly, the "content" recorded in operation 302 of method 300 and forming the various events within a given stream includes any combination of: user interactions; associated actions and/or events performed by the computing device; a timestamp associated with each interaction and/or associated device action; an event location (which may be indicated or derived from, e.g., coordinates within the device display, a name of a particular widget or element of a UI with which a user interacted, etc., a hierarchy of a particular widget or element of a UI within an overall application (as may be obtained from the OS and/or constructed through screen analysis for opaque applications/environments such as typical for virtualized applications (e.g., SAP over CITRIX)); an identity of the user; an identity of the computing device; a target of the event (e.g. a name, process ID, etc. of an application with which the user is interacting, a case or project number to which the user interaction relates, a data source with which the user is interacting or upon which the event relies, the name or hierarchy of a widget or element of the UI with which the user interacted, etc.); and/or ancillary/contextual information relating to the event(s).

In various approaches, ancillary/contextual information relating to events recorded in operation 302 may include any combination of: window and/or screen content, e.g. images, raw text, information extracted from an image of a window or screen, etc.; device activity associated with an event (such as which process(es) are invoked during or in response to an event; which screens, windows, etc. pop up in the course of or in response to performing an event; HTTP or other network requests received or sent in the course of or in response to performing an event; network packets sent or received in the course of or in response to performing an event; and any other suitable action capable of being performed by a device using or through a regulated API in the course of or in response to performing an event, such as database operations, etc. as would be appreciated by a person having ordinary skill in the art upon reading the present disclosure).

In additional approaches, ancillary/contextual information relating to events recorded in operation 302 may include any combination of the foregoing, as well as optionally including logs related to user activity. For instance, relevant logs may include local logs, remote logs (e.g. from server-based line of business (LOB) logging systems), etc. in various implementations. For example, logs may be useful for identifying different tasks, e.g. according to identifiers associated with various tasks and/or data objects used frequently in performing particular tasks. Logs may further be useful for obtaining contextual information regarding particular events. Of course, a lag exists between user actions and their reflections in logs, especially if those logs are located remotely on a server reacting to input made by a user. Thus, correlating log entries with user actions and the events they create needs to take into account this slight, yet variable difference in timing, as would be appreciated by a skilled artisan reading the present disclosures.

Regardless of the particular type and sequence of events performed during a given user session (e.g. a given work day), the entire recording collected in operation 302 of method 300 is stored in a database on a per-event basis, such that each database entry comprises an event stream. In preferred approaches, each event stream is represented as a table, with each entry (row) in the table corresponding to an event, although various implementations may include multiple rows for any given event, e.g. where the event includes a combination of inputs such as a keystroke, a mouse click, and one or more associated API calls performed by the device. Where events comprise multiple actions, preferably the actions are identifiable as forming a single event, e.g. by an event identifier field included in the table.

Moreover, in various approaches multiple entries tied together by an event ID can also be used to convey the UI hierarchy associated with the given event. For example, if a user clicks on a given day in an Outlook calendar UI, the multiple entries can be used to show the hierarchy of widgets (i.e. frames within frames). For example, [row 1] click on Outlook, [row 2] click on the calendar frame, [row 3] click on day 23, etc., because the user performing this action in fact did click on all those things.

In various approaches, such an occurrence within an event stream can be a useful feature, particularly as it relates to the concept of application traces. More generally, in some approaches and as described in greater detail below, these actions represent "subtraces," i.e. a sequence of events recorded in operation 302 but which are assumed to be smaller in scope than a trace. The subtraces may exist at the application level, but can also be implemented at the element level, e.g. Dialog X or Tab Y within the application/UI. The multiple-row hierarchy in the recorded data lends itself well to delineating as subtraces the sequences of events that occur within any particular level of the UI hierarchy.

In a preferred but illustrative implementation, the event table representing sequences of events recorded in operation 302 may include fields and corresponding data including, but not limited to, any combination of the following:

a) a "session ID" field and corresponding numerical or alphanumeric identifier;

b) an "event ID" field and corresponding numerical or alphanumeric identifier for an individual event;

c) an "element ID" field and corresponding numerical or alphanumeric identifier for a given element of an event (e.g. where an event description requires multiple levels in a UI hierarchy or spans multiple interactions/actions);

d) an "event type" field and corresponding description, e.g. a key press, mouse click, touch gesture, audio input, visual gesture, API call, etc.; a "value field" and corresponding value indicating a specific user interaction/device action performed, e.g. an identifier of a particular key, particular mouse button, particular API call, etc. (notably the value may be expressed in any suitable form, such as a scan code, an ASCII code, or Unicode value corresponding to a particular keypress, shortcut key corresponding to a particular input, or any other suitable manner of mapping a value to corresponding input provided by the user and/or action performed by the device);

e) a "count field" and corresponding incremental value indicating a number of times the corresponding event was detected;

f) a "key modifier" field and corresponding value of any appropriate modifier input or associated with a user interaction (e.g. identifying a second keystroke associated with the event, such as Control, Shift, Alt, etc. and which may be expressed in any suitable form such as described above for the value field);

g) a "process name" field and name of an associated computer process (which may be specified from the user, obtained from image data depicting the process, obtained from or provided by the system manager/task manager of the operating system, obtained by performing a lookup using a related value such as a process ID, or any other suitable technique for obtaining computer process names), such as "notepad.exe" "WINWORD.exe", etc. as would be appreciated by a skilled artisan reading the present disclosures;

h) an "element name" field and associated names of different elements of a given process or UI, including different fields, buttons, menu items, and other widgets in a UI hierarchy with which a user may interact (e.g. "Untitled—Notepad" referring to the Notepad window, a "Save As" element referring to the "save as" dialog within the Notepad window, a "File name:" element corresponding to the filename button with which a user may interact to designate an appropriate file name for the Notepad file to be saved, etc.);

i) an "element class" field and corresponding descriptive value indicating the object type of a UI element (e.g. button, window, combo box, menu, dialog, etc.), the software class with code for implementing the UI element within the window hierarchy, e.g. "Button", "Window"; and/or the name of the instance of the class that is being implemented in a given process;

j) an "element type" field providing additional context regarding the nature of the user interaction with the particular element interacted with, (e.g. a window, a pane, a dialog, a combo box, an editable field, a button, a title bar, etc. as would be appreciated by a person having ordinary skill in the art upon reading the present descriptions);

k) an "element auto ID" field and any corresponding automatically-designated value for a particular event, e.g. an API name associated with a particular function or other alphanumeric identifier;

l) an "element enabled" field and corresponding binary value indicating whether the element interacted with by the user was enabled at the time the event was recorded; and m) a timestamp field indicating a time at which the event was recorded (e.g. a time of day or sequential timestamp beginning at an arbitrary moment such as upon initiation of event recording).

Of course, in various approaches the event table may comprise any suitable combination of the foregoing. The table need not include all of the foregoing fields, and/or may include additional fields, without departing from the scope of the inventive concepts described herein. In one preferred implementation, the table includes at least the fields: event ID, element ID, event type; value; process name; element name; element class; element type and timestamp. Another preferred implementation of the table may include at least the fields: event ID, element ID, event type; value; process name; element name; and timestamp.

In one exemplary instance, a user generates an event by entering the value "x" into a "File name" combo box field of a "Save As" dialog for the application "Notepad". This single keystroke entered by the user may correspond to an event including five elements which fully identify the interaction performed by the user and the hierarchy of device/user interface actions performed as part of the event. Accordingly, the table representing the event stream including this single keystroke may include five rows dedicated to describing the event. Each row has the same event ID value (e.g. 3130) but a different element ID (e.g. a sequential identifier from 1 to 5) to indicate the context of the event's performance. Although the user apparently only interacted with a single element (here a combo box associated with the label "File Name") this interaction was performed in the context of the "Save As" dialog for an instance named "Untitled" of the process "Notepad.exe". Accordingly, suitable entries for the table storing the recorded event may be substantially as shown for event ID 3130 in Table 1, below, where the value "46" is to be understood as corresponding to a keystroke directing input of a lowercase "x" character. A subsequent event including three elements and corresponding to the user clicking the "Save" button of the same "Save As" dialog is described in accordance with event 3131.

TABLE 1

Exemplary, Abbreviated Event Stream

| Event ID | Element ID | Event Type | Value | Process Name | Element Name | Element Class | Element Type | Time |
|---|---|---|---|---|---|---|---|---|
| 3130 | 1 | Key press | 46 | Notepad.exe | Untitled - Notepad | Notepad | window | 00:01.6 |
| 3130 | 2 | Key press | 46 | Notepad.exe | Save As | #32770 | dialog | 00:01.6 |

TABLE 1-continued

Exemplary, Abbreviated Event Stream

| Event ID | Element ID | Event Type | Value | Process Name | Element Name | Element Class | Element Type | Time |
|---|---|---|---|---|---|---|---|---|
| 3130 | 3 | Key press | 46 | Notepad.exe | | DUIViewWnd ClassName | pane | 00:01.6 |
| 3130 | 4 | Key press | 46 | Notepad.exe | File name | AppControl Host | combo box | 00:01.6 |
| 3130 | 5 | Key press | 46 | Notepad.exe | File name | Edit | edit | 00:01.6 |
| 3131 | 1 | mouse click | 1 | Notepad.exe | Untitled - Notepad | Notepad | Window | 00:02:02 |
| 3131 | 2 | mouse click | 1 | Notepad.exe | Save As | #32770 | Dialog | 00:02:02 |
| 3131 | 3 | mouse click | 1 | Notepad.exe | Save | Button | button | 00:02:02 |

Of course, in other exemplary implementations the table may include more or fewer fields and/or different values, particularly any fields and/or values described hereinabove. For instance, in various approaches the table may include screenshots of the user's activity at some or all timestamps, text extracted from OCR of screenshots and information derived therefrom (e.g. key-value pairs that reflect values of named fields), processes running on the system, process logs, etc. In various approaches, the table may also include contextual information about the user's activity at the time the various recorded events were performed.

In more implementations, other storage schemas (preferably using one or more databases or similar organizational structures) are possible and valid. For instance, one implementation employs three tables, one table comprising user information, a second table comprising event information, and a third table comprising hierarchical information about each event.

Again, it will be appreciated that an exemplary event stream recorded in operation 302 within the context of the presently described inventive concepts includes hundreds or thousands of events for a single event stream, preferably about 3,000 to about 5,000 events per stream. Moreover, identifying automatable tasks may preferably operate on a data set including hundreds or thousands of event streams (and thus likely millions of events), with more streams generally being preferred.

Preferably, the event recording per operation 302 of method 300 is performed as a background process substantially transparent to the user so as to avoid interfering with the user's normal performance and ensure complete/robust data collection. However, in various approaches a user may be provided a mechanism to activate/deactivate the recording process, e.g. to provide privacy, protect sensitive information, etc. Similarly, the event recording function may be configured, e.g. in a configuration file, to filter different types of events, time periods, applications, etc. that may be relevant or irrelevant to a given type of task. In this manner, the recording function may be tailored to facilitate recording only events relevant to a given task, or at least reduce the proportion of irrelevant events included in an overall event stream.

While the foregoing descriptions focus on user input primarily including keypresses, mouse clicks, and other common I/O, it should be understood that the inventive concepts are equally applicable to scenarios including or consisting of input in the form of gestures, audio input, visual input (e.g. captured using one or more cameras), acceleration, orientation, and position input (e.g. as may be obtained from an accelerometer, gyroscope, compass or magnetometer, etc.), etc. without limitation.

For instance, in one approach users may provide input to a computing device primarily via one or more peripherals including virtual reality I/O devices such as goggles with a display, accelerometer(s), magnetometer(s), gyroscope(s), microphone(s), and speakers, as well as one or more controllers (e.g. handheld controllers) and optional other sensors which may be placed around an operating environment. In such implementations the inputs would be any type of input that may be generated using the foregoing device(s), singly or in combination, and may correspond to actions displayed on the goggles, as well as occurring outside the user's field of view but within the VR environment with which the user is interacting/engaged.

Event streams as described above are stored, preferably in one or more tables in a central or distributed database, and may be recalled at any time. Although any suitable format may be used without departing from the scope of the present disclosure, individual event streams may be stored as delimited text files, such as comma separated values (.csv), tab-delimited text files, or any other suitable alternative thereof as known in the art.

Cleaning and Normalization

An optional but preferable operation of method 300 follows recording of event streams in operation 302 and involves cleaning and/or normalizing the recorded event streams.

Event streams as described above are stored, preferably in one or more tables in a central or distributed database, and may be recalled at any time. Although any suitable format may be used without departing from the scope of the present disclosure, individual event streams may be stored as delimited text files, such as comma separated values (.csv), tab-delimited text files, or any other suitable alternative thereof as known in the art.

Cleaning and normalization may be considered techniques for enriching the signal to noise ratio within any given event stream, as noise (e.g. irrelevant events, redundant events, equivalent events, etc.) distract from the accuracy of the stream in terms of representing the particular trace employed by the user to perform the task. Ideally, a trace includes only the minimum set of events required to perform the associated task. As will be appreciated by skilled artisans upon reading the present disclosure, the ideal trace excludes all noise and consists of signal (meaningful events in the context of performing the task), although such skilled artisans will also appreciate the difficulty of eliminating all noise from any given dataset.

Cleaning essentially seeks to reduce the data set by eliminating irrelevant and/or misleading information from the event streams. In preferred approaches, cleaning may involve analyzing the text of the event stream records, and identifying redundant irrelevant events, streams, etc. In accordance with one aspect of the inventive concepts presented herein, a library of events for an operating system and/or application may provide names and/or descriptions of events that may be determined irrelevant, such as display manipulation operations (e.g. window move/size, minimize/maximize, etc.); calls to predetermined irrelevant applications, etc. as would be understood by a person having ordinary skill in the art. Such irrelevant events may be flagged or otherwise disabled for the purposes of the software robot using any suitable known technique.

In more approaches, a given event stream may include redundant events such as clicking on the same element of a UI multiple times consecutively (consider an impatient user interacting with a slow or unresponsive system). Additionally or alternatively a user may perform different actions which are cyclic in nature, and bring an interface from a first state through one or more intermediate states, and back to the first state without making any meaningful changes, such as minimizing and maximizing a window repeatedly, or repositioning a window from a first location to a second location without any intervening actions (consider a user simply rearranging windows within a display, scrolling within a document or web page, and/or switching between overlapping windows repeatedly, each of which may assist the user in viewing relevant information, but none of which are pertinent to automation of the underlying task—particularly when being performed by a robot).

In order to clean up an event stream, subsequent, repeated events comprising the same elements, event types, values, process names, element names, and/or element types but different timestamps may be identified and all but one iteration of the subsequent, repeated events eliminated from the table, or flagged in an appropriate manner to ignore the subsequent repetitions when identifying processes for automation and/or building models for RPA.

With continuing reference to optional operations to be performed on event streams recorded in operation 302, normalization, like cleaning, also seeks to reduce the size of the event stream, but focuses on identifying different events that are equivalent and/or related, rather than simply redundant or irrelevant events. For example, different users may accomplish the same ultimate effect using different events, such as copying and pasting a value from one window or field to another using exclusively mouse clicks (e.g. right click on source, select "Copy" function from drop-down menu, then right click on target, select "Paste" function from drop-down menu, versus using a combination of mouse clicks and key strokes (e.g. left click on source, keypress Control+C, then left click on target, then keypress Control+V). There may be no overlap between the events even though the start and end states are identical, in various approaches. Other exemplary approaches in which apparently distinct events may be redundant includes events recorded using different operating systems or environment, e.g. MACINTOSH OS versus MICROSOFT WINDOWS versus LINUX RED HAT, etc., each of which may include unique input combinations for accomplishing the same task (e.g. different keypresses or combinations thereof, as would be appreciated by a person having ordinary skill in the art upon reading the instant descriptions). As described above with reference to irrelevant events, a library of equivalent events may be learned over time based on observing OS/application event calls in conjunction with screen/video data. Once equivalencies are established, they may be identified within an event stream and eliminated or ignored in the corresponding robotic process.

In another example, normalization may involve combining a series of apparently distinct but in fact related events into a single event. For example, a user may input multiple keystrokes into a single field. Keeping in mind the objective of the presently described inventive concepts is not to record each and every action/interaction in the most granular possible manner, but rather to capture all critical events within a task, only the ultimate value entered into the field is relevant to the overall performance of the task. Accordingly, normalization may include combining the various related keypress events corresponding to the single value entry into a single event representing the overall value entered into the field. A good example of this is backspace. If a user enters keypresses "a-b-d-*-c-d" (backspace=*), the final value "abcd" is all that is required to generate an automation model. Another example includes left-right arrows when the focus is a text box.

In more approaches, normalization may include identifying events that do not have an appreciable impact on the state of a given application/UI, and/or do not contribute meaningfully to performance of a task. For instance, mis-clicks (e.g. occurring outside the boundaries of an application window, or on an element of a UI that has no associated function, such as a static field label) and/or mis-keypresses (e.g. performed when no element that accepts textual input is selected) are recorded, but do not result in any change of state in the corresponding application/UI. Another example would be typing the CTRL key and releasing it without typing another key.

In various approaches, cleaning and/or normalization may be achieved using any method known in the art. Preferably, a parsing mechanism using regular expressions or context-free grammars is used. For instance, regular expressions can define the events that should be removed from the event stream during cleaning. A rule such as:

```
'res': ["^leftClick:
explorer_exe.pane\(\).pane\(\).button\(Show desktop\)$'],
'replacement': ''"
``` indicates that any event matching the regular expression describing a click action on the "Show Desktop" button should be replaced with nothing, i.e. removed. Such rules may also express conditions applying to several events in sequence such as

```
'res': ["^leftClick: explorer_exe.\(pane\).\(pane\).Clock$',
"^leftClick: explorer_exe.\(pane\).\(pane\).Clock$'],
'replacement': ''"
```

Here, two subsequent click actions onto a particular button (in this case toggling the clock control on a Windows computer) would cancel each other out and can be removed.

Normalization can also be achieved using regular expressions. Any number of conditional regular expressions can be expressed, matching consecutive events. Back-references, as understood by an artisan, can be used to indicate cohesion between events, for instance by enforcing that events pertain to the same application. A replacement term finally defines which event should replace the events that have been successfully matched. For instance, the rule:

```
'res': ['^leftClick: (.*).Application.(File|Edit|Format|View)$',
'^leftClick: {args0[0]}.Edit.Copy\s+Ctrl\+C$'],
'replacement': 'Copy: {args0[0]}'
``` would indicate that two consecutive events, the first a click event on a menu button, and the second one a click event on the "Copy" menu item of the "Edit" menu, both of which occur in the same application, are to be replaced by the artificial "Copy" event defined in the replacement. In order to achieve normalization of all events indicative of copying something, similar rules for other incarnations of the action would be defined, e.g.:

```
'res': ['^(.*?) (.*)_CtrlC!_$'],
'replacement': 'Copy: {args0[1]}'
``` in which the keyboard action of pressing the Control key and the "c" key simultaneously is replaced with the artificial "Copy" event.

A rule system of this kind may contain many match/replacement pairs, preferably ordered by specificity. Each rule is applied to the whole event stream, matching starting at each event position. The complete rule system is then iteratively executed on the event stream until no further replacements can be performed. It should be noted that different rule sets may apply to different sources of event stream.

It should be noted that the exemplary cleaning and/or normalization processes described above may be performed in conjunction with filtering to further focus the content to be analyzed for identification of processes for robotic automation and/or building of RPA models, in some approaches.

It should be further noted that cleaning and normalization may, in some approaches, be disadvantageous in certain contexts. Over-cleaning or normalizing may result in loss of valuable information, which is a primary reason that this second phase of the opportunity identification process is optional. In various approaches, normalization may be substituted with appropriate machine learning algorithms as known in the art, in order to separate noise from signal within a given event stream (or set of event streams) and prune the data set accordingly.

With continuing reference to FIG. 3, in operation 304 of method 300, each recorded event stream is concatenated. The concatenation process preferably also includes some parsing, such that for example each event stream is preferably organized according to individual events (e.g. via line breaks, tab or other delimiters, etc. as would be known by a skilled artisan upon reading the present disclosure). Accordingly, the result of concatenation may be a more organized structure than simply a single string of all events in a recorded stream, but may also be parsed to some extent to facilitate human review of the event stream (e.g. during model selection, in order to better understand the context of each event). In various approaches, concatenation per operation 304 may be performed substantially as described hereinabove regarding "event recording."

Segmentation and Clustering

As described herein, and in accordance with method 300, identifying processes for RPA involves segmenting individual traces/tasks within the event streams, as well as identifying different task types and grouping (clustering) traces corresponding to the same task type. In a preferred implementation, segmentation according to the various implementations and aspects described herein is performed as operation 306 of method 300, and similarly clustering according to the various implementations and aspects described herein is performed as operation 308 of method 300. Each operation may respectively involve any combination of corresponding features, sub-operations, functions, etc. as described herein performed in any order, including but not limited to: clustering followed by segmentation, segmentation followed by clustering, combined segmentation and clustering, automatic and/or manual segmentation and clustering. Most preferably, identifying processes for robotic information per method 300 includes a combined, automated segmentation and clustering approach.

Segmentation and clustering per operations 306/308 of method 300 represents a core challenge within the context of identifying processes for RPA and the inventive techniques described herein are a significant improvement over conventional RPA techniques, as this segmentation and clustering approach enables identification of individual tasks and traces, as well as corresponding processes for robotic automation which may otherwise be imperceptible to a human seeking to improve efficiency of an enterprise in view of the same data.

As will be appreciated by skilled artisans reading the present disclosure, identifying traces/tasks within an event stream and determining the type of task being performed is a particular challenge because the event recording process employed herein does not include any "tell-tale" delineators between events/tasks (such as typically implemented for human-driven processes such as via a "start/stop" button, command, signal, or equivalent thereof; using separator signals such as a keyword, logo, or image displayed within a UI; switching focus away from a particular UI or application, etc. as will be understood by skilled artisans upon having reviewed these descriptions in full).

Moreover, in the context of the presently described inventive concepts, tasks may vary in execution according to user, device, or simply instance (e.g. a same user performing the same task using different approaches on two or more different instances). For instance, different event streams or traces corresponding to the same task may vary in terms of the order of events or event groups performed, the elements of events, presence of spurious (e.g. irrelevant or redundant) events, timing of events, etc. in various approaches.

With continuing reference to FIG. 3, operation 306 of method 300 involves segmenting some or all of the concatenated event streams to generate one or more individual traces performed by the user interacting with the computing device, each trace corresponding to a particular task. Segmentation may be performed, in various approaches, using any technique described herein, without departing from the scope of the presently disclosed inventive concepts.

For example, in one approach segmenting of operation 306 comprises splitting the concatenated event streams into a plurality of application traces, each application trace comprising a sequence of one or more events performed within a same application. In another approach segmenting comprises splitting the concatenated event streams into a plurality of element traces, each element trace consisting of a sequence of one or more events performed with respect to a given element of a user interface used to facilitate the user interacting with the computing device.

Accordingly, in order to delineate between different tasks and/or traces, while retaining sufficient similarity between different variants such that different tasks/traces are identified, but retain sufficient similarity to be grouped together into a single cluster, the presently disclosed inventive concepts employ a segmentation approach 306 as shown in FIG. 3, and proceeding substantially as follows.

The simplest implementation of segmentation per method 300 and operation 306 involves analyzing the text of concatenated event streams to extract common subsequences of a predetermined length. A major and unique challenge for repetitive pattern discovery in RPA mining is that the length of sequences of events that implement the same task is not the same, and that there is a duration associated with each event. Notably, this challenge is unique in the context of RPA mining, even though other fields such as bioinformatics face similar problems with respect to pattern discovery. Without consideration of the duration of events, an event sequence can be represented by a sequence of characters, without loss of generality. For instance, suppose that ABAB-CABABCABABC is an event stream. It contains repetitive sequence patterns that may not be unique. For instance, repetitive sequence patterns with length 2 are AB; BA; BC in the above event stream. The repetitive sequence patterns with length 4 are ABAB; BABC; ABCA; and BCAB, while the repetitive sequence patterns with length 5 are ABABC; BABCA; ABCAB; BCABA; and CABAB.

In practice, the boundaries of the actual sequence of events recorded in operation 302 and which represents a task are difficult to determine, particularly for shorter subsequences. For example, a subsequence ABABCABABC of length=10 repeats in the following event stream: ABABCA-BABCABABCABABC (More specifically, a contiguous subsequence, which means that a subsequence made up of consecutive elements (characters, events) in a sequence). As such, even though the subsequence includes half of the events in the entire stream, the true boundary for the subsequence of length 10 cannot be absolutely determined because other subsequences appearing twice or more also exist within the overall sequence. Even the actual boundary of the task (represented in this example by repeating subsequence "ABCAB") is not capable of being determined, because the real sequence pattern is a part of the long sequence: ABABCABABC.

Thus, in some situations it may only be possible to identify event sequences recorded in operation 302 that contain frequently executed tasks, but not always possible to exactly isolate the boundaries. As a general heuristic, in situations where general boundaries are not capable of exact definition, it is preferably to favor longer repetitive sequence patterns over shorter ones. In other words, in preferred approaches of the presently disclosed inventive concepts the longest possible repetitive sequence is the preferred seed or signal to delineate sequence boundaries. Those longer patterns may also be used for robot creation, since a human user/curator can determine the exact boundaries of the useful sequence.

A more sophisticated analysis in the context of operations 306 and 308 of method 300 allows more exact delineation of task boundaries within event sequences. Even though sequences of events that extend across task boundaries are observed, it can be assumed that their frequency should be significantly lower than the frequency of the sequence within a task. The reason for this is that the work load of operators performing a set of tasks is generally not strictly ordered, but contains some randomness in the selection and/or order of specific tasks performed during a typical work day. Those having ordinary skill in the art will appreciate that the assumption does not hold universally, for example where workloads are relatively simple (few types of events) and/or well-ordered.

Thus, preferred implementations of the inventive concepts presented herein employ segmentation in operation 306 of method 300 by analyzing many traces to identify event sequences that are frequent (e.g. occurring at least as frequently as a minimum frequency threshold). If a number of identified event subsequences meets or exceeds the minimum frequency threshold, the subsequence is extended and the search performed again. In this way, segmentation iteratively grows the seed event sequences and searches for the new set of sequences until it is no longer plausible that the sequences still contain events pertaining to one task. At this point, task boundaries may be defined with high confidence.

In various approaches, a minimum frequency threshold value in a range from about 1.0 to about 10.0 may be used for smaller data sets, e.g. representing on the order of about $1.0 \times 10^4$ to about $9.99 \times 10^4$ events, preferably a minimum frequency threshold value in a range from about 2.5 to about 7.5, and most preferably minimum frequency threshold value of about 5. In other approaches, for larger data sets representing a number of events on the order of about $1.0 \times 10^6$ events or more, a minimum frequency threshold value in a range from about 50 to about 200 may be used, preferably a minimum frequency threshold value in a range from about 75 to about 125, and most preferably minimum frequency threshold value of about 100.

In still more approaches, the minimum frequency threshold may be defined in terms of a target fraction of the total event stream to be recovered/sampled/retrieved for further analysis. For instance, a minimum frequency threshold may be defined so as to retrieve/sample/recover a fraction of event streams ranging from about 5% to about 15% of all recorded event streams, preferably a fraction of event streams ranging from about 7.5% to about 12.5% of all recorded event streams, and most preferably a fraction of about 10% of all recorded event streams, in various implementations. Given this fraction, the minimum frequency threshold may be varied until the desired fraction of event streams is achieved.

As an example, if during a segmentation operation 306 the following sequences are observed five times each within a given event stream or set of event streams: ABCDEFGHI, ABCDEFGPQ, XYZDEFGHI, and XYZDEFGPQ, then it is plausible to assume that the sequence "DEFG" represents a common individual task, and that the sequences "ABC" and "PQ" are instances of other tasks and should not be combined with the sequence "DEFG." The frequency thresholds that indicate whether or not to extend a sequence are experimentally determined, in various approaches.

Returning now the implementation of operation 306 involving extraction of common subsequences of a predetermined length n, in various approaches extraction can be achieved by known means, e.g. using suffix trees, tries, or any suitable equivalent thereof that would be appreciated by a person having ordinary skill in the art upon reading the present disclosure. The value of n may vary from some arbitrary small value (e.g. 10) to an arbitrary large value (e.g. 50), and identical traces may be grouped together as models based on sequence similarity.

However, given the aforementioned potential for variability in the exact performance of a task according to different traces, this approach only groups essentially identical traces, and thus disadvantageously separates the event stream into common variants rather than common tasks (e.g. in operations 306 and 308), frustrating or defeating the ability to subsequently evaluate different variants relative to one another (e.g. via prioritizing identified processes for robotic automation per operation 312 of method 300); select the most efficient trace (or combination thereof) among all traces corresponding to a given task (e.g. per operation 314 of method 300); and accurately measure the value of automating the task.

Accordingly, several implementations of segmentation in accordance with operation 306 involve a more complex classification or labeling process than described above. In essence, the classification portion includes marking different events according to the task to which the events belong. In one approach, this may be accomplished by identifying the events that delineate different tasks, and labeling events as "external" (i.e. identifying a task boundary, whether start or end) or "internal" (i.e. belonging to a task delimited by sequentially-labeled boundary events). Various exemplary approaches to such classification include known techniques such as binary classifiers, sequence classification, and/or phrase tagging (e.g. as typically employed in the context of natural language processing). However, such approaches require a ground truth from which to determine the event boundaries and create associated supervised models, and in most situations consistent with the presently described inventive efforts, no such ground truth(s) is/are available.

Moreover, in certain approaches segmentation per operation 306 of method 300 uses unsupervised models to delineate different tasks within event streams. For instance, in one approach, change point detection may be employed, e.g. using Gaussian processes, to identify break points between tasks. In more approaches, a predefined window of length N may be used to segment event streams into individual traces. Preferably, N has a value of about 30 events, but may vary according to the type of task typically performed by a given enterprise, e.g. according to a known average task performance time and/or average number of interactions involved in performing a task.

In other, less preferred approaches, identifying tasks via segmentation in operation 306 may involve manual segmentation, whereby a human user reviews a video recording and/or other summary of an event stream (e.g. the table generated describing the event stream) and manually delineates the start and stop points for various tasks, along with (optionally) task type. Manual segmentation may also be achieved by repeating tasks by a human that have been identified as being subject to automation efforts, and using indicator events to separate traces.

Manual segmentation may assist with annotation of tasks not easily capable of identification using automated techniques, but users are not well trained/equipped to identify tasks according to automation value, and tend to generate overly large task identifications corresponding to human-perceived boundaries rather than automation boundaries that are generally hidden from human perception/detection (e.g. because such tasks may be considered too small or trivial to merit automation). Moreover, manual segmentation adds to the up-front cost (which may be represented by a weight) of the automation effort, and does not lend well to identifying automatable tasks as emergent properties of the recorded event stream data.

Combined Segmentation and Clustering

Various approaches and instances of segmentation and clustering in the context of method 300, and specifically operations 306 and 308, have been described hereinabove. In the most preferred approaches of the presently disclosed inventive concepts, operations 306 and 308 may be combined and/or performed substantially in tandem as part of a combined clustering/segmentation approach, without limitation as to inclusion or exclusion of any aspect of segmentation and/or clustering as described herein.

According to the preferred, "combined" or "hybrid" segmentation and clustering approach, recorded event streams are concatenated (optionally following cleaning/normalization), and substantially similar subsequences (i.e. having a content similarity greater than a predetermined similarity threshold) that appear within an event stream more often than a predetermined frequency threshold and cannot be extended in length without creating larger overall changes in the clustering (e.g. greater than a predetermined weight or distance threshold) are identified.

Various aspects of the hybrid segmentation and clustering approach are described herein below. In accordance with particularly preferred approaches, the hybrid segmenting and clustering approach includes: identifying, among the concatenated event streams, one or more segments characterized by: a content similarity greater than or equal to a predetermined similarity threshold; a frequency of occurrence within the concatenated event streams greater than or equal to a predetermined frequency threshold; and a length that, if extended further, would cause a change in a corresponding cluster including the one or more segments, wherein the change is characterized by a magnitude greater than or equal to: a predetermined clustering weight threshold; and/or a predetermined clustering distance threshold.

In accordance with this aspect of the presently disclosed inventive concepts, and again bearing in mind the primary objective of identifying a minimum set of relevant events within various tasks, it is advantageous to implement a partial clustering approach wherein not all identified events are included in a cluster. For instance, on the large scale described herein where a given data set may include millions of events, a clustering approach that assigns approximately 10% of all available traces into clusters is suitable to identify advantageous processes for RPA. Indeed, many (most) of the recorded events will not be suitable for RPA because they are not sufficiently regular and repetitive. Regardless of the ultimate coverage level achieved, subsequences identified are the traces, and clusters are groups of traces corresponding to a same task type from which RPA models may be built.

With continuing reference to the exemplary hybrid segmentation/clustering approach, in one implementation identifying traces and grouping according to task type includes defining a sliding event window length N corresponding to the expected length (number of events) of traces represented in the event streams. Preferably, N is a value in a range from about 10 to about 50 events, and more preferably is a value of about 30 events, e.g. 25-35 events.

The concatenated event streams are parsed into subsequences using the sliding window length N and feature vectors are calculated for each subsequence starting at each position within the event stream. In an exemplary embodiment, each subsequence includes categorical and/or numerical features, where categorical features include a process or application ID; an event type (e.g. mouse click, keypress, gesture, button press, etc.; a series of UI widgets invoked during the subsequence; and/or a value (such as a particular character or mouse button press) for various events in the subsequence. Numerical features may include, for example, a coordinate location corresponding to an action, a numerical identifier corresponding to a particular widget within a UI, a time elapsed since a most recent previous event occurrence, etc. as would be appreciated by a person having ordinary skill in the art upon reading the present disclosure.

Preferably, the feature vectors are calculated using a known auto-encoder and yield dense feature vectors for each window, e.g. vectors having a dimensionality in a range from about 50 to about 100 for a window length of about 30 events per subsequence. Exemplary auto-encoders suitable for calculating features for the various subsequences may include conventional auto-encoder networks, language-oriented networks (e.g. skip-grams), fastText, etc. as would be appreciated by a person having ordinary skill in the art upon reading the present disclosure. Alternatively, feature vectors can be calculated in this manner for each event in the event stream, using any of the methods above, and the feature vector for a window of length N starting at position p is the concatenation of the feature vectors of the events corresponding to the positions p through p+N−1.

Regardless of the particular manner in which feature vectors are generated, a distance matrix is computed for all pairs of subsequences. The preferred metric for the distance given the calculation of the feature vectors as described above is the Euclidean distance; however, other distance metrics can also be of value, for instance the cosine similarity, or the Levenshtein distance if the feature vectors are understood to be directly word sequences in the event language. Clusters of non-overlapping subsequences may then be identified according to similarity, using various techniques and without departing from the scope of the inventive concepts described herein. For example, in one embodiment a predetermined set k of pairs of subsequences characterized by the smallest distances between the elements of the pairs among the overall distance matrix may be selected as initial clusters representing k task types.

Optionally, but preferably, the initial k subsequences pairs chosen as clusters are supplemented by adding additional subsequences characterized by the next smallest distance to elements of the initial k subsequences. For example, additional subsequences may be added to the initial set k in an iterative fashion according to smallest distance until an overall distance and/or complexity threshold is reached, at which point the clustering is considered complete.

In other words, in a particularly preferred approach clustering includes: defining a set k of subsequence pairs from among the one or more individual traces, each subsequence pair being characterized by a distance di between two respective subsequences forming the subsequence pair, and wherein the distances di are of lesser magnitude than a distance between any given subsequence in the set k and any other subsequence among the one or more individual traces; and generating an initial clustering of the set k of subsequence pairs, wherein each cluster of the initial clustering comprises one of the subsequence pairs in the set k. The distance di is preferably measured between a longest common subsequence shared among the subsequence pair; and more preferably is expressed according to a measure selected from a group consisting of: a Euclidean distance, a Levenshtein distance, a Hamming distance, and an auto-encoder metric.

With continuing reference to the particularly preferred approach, clustering may further include: updating the initial clustering by iteratively adding one or more additional subsequences to the initial clusters, wherein each additional subsequence added to a given initial cluster is characterized by a distance between the additional subsequence and at least one member of the given cluster having a magnitude less than a maximum clustering distance threshold, wherein the maximum clustering distance threshold is a value of at least 2 standard deviations smaller than a median distance between the members of the subsequence pair and any other subsequence in the plurality of event streams; extending one or more of the subsequences of the updated clustering to include: one or more additional events occurring before the events included in the respective subsequence; and/or one or more additional events occurring after the events included in the respective subsequence; determining a complexity of at least one cluster of the updated, extended clustering by applying a complexity measure to the updated clustering including the extended subsequences; and iteratively further extending the one or more of the subsequences of the updated clustering until determining the complexity of the updated, extended clustering is greater than or equal to a predetermined maximum complexity threshold.

The complexity measure referenced above is preferably based at least in part on: an average number of edges per vertex in a graph representing the clustering; a number of alternate edges required to extend the clustering to include one or more additional preceding events; a number of alternate edges required to extend the clustering to include one or more additional subsequent events; and/or a distance metric between at least two subsequences in the at least one cluster of the updated, extended clustering.

In this process, an additional subsequence may only be added to an existing cluster when the distance to an element of said cluster is small. Small in this case, assuming Euclidean distances contained in the distance matrix, means preferably at least about 3 standard deviations smaller than the median distance between the cluster and all other subsequences. In addition, a limit on the number of subsequences to be added is enforced, for instance limiting the size of any cluster to at most 200 subsequences. In case of other distance metrics, other limits may apply. For instance, when the Levenshtein distance is used, a suitable upper limit is preferably about 10% or less of the length of the element to be added.

In more approaches, the clustering described immediately above may be further expanded by extending subsequences bidirectionally, to include additional events occurring before and after the initially-defined window. In such cases, it is advantageous to evaluate the clustering after each subsequence extension according to a complexity measure, e.g. based on overall graph complexity (e.g. according to the number of nodes and edges present in the graph, the number of paths through the graph, or the number of edges across a cut of the graph based on its topological order) and/or a window-based distance metric. In any event, and as noted above, the subsequences are preferably extended as far as possible, e.g. until reaching/surpassing a predetermined overall distance and/or complexity threshold, at which point clustering is complete.

In particularly preferred approaches, multiple window lengths may be applied to each event stream and the clusters resulting therefrom overlapped to improve overall precision, as would be appreciated by persons having ordinary skill in the art upon reading the instant disclosure.

In yet more approaches, finding subsequences and extension thereof is combined. Starting with the pair of subsequences with minimal distance, their start and end positions are systematically varied to find optimal values for each. Optimal in this context preferably means that the distance between the two event sequences is minimal, accounting for the length of the subsequences. Then, additional nearest neighbors are added, again varying their start and end positions to maintain optimality.

In additional approaches, calculating the complete distance matrix for all subsequences is too expensive in terms of processing time. Instead, for each subsequence, the nearest neighbor according to the distance metric of choice is identified. Any known method can be used, but it is advantageous to perform this operation in an approximate way using a matrix profile. The initial cluster is then identified by choosing the subsequence whose nearest neighbor is closest as the initial member of the cluster, and adding the nearest neighbor as well. Additional members are chosen by selecting the nearest neighbor of the member just added, until there is no such member. Alternatively, after choosing the initial member(s) of the cluster, the distances to all other subsequences can be computed, and additional members added as described above.

In either of the foregoing exemplary cases, the subsequences can be extended to the left and right by computing a similarity between two candidates that have been extended along a common direction. For instance, each of two candidate sequences could be extended to the left by one to a certain number of events (preferably half the length N of the sliding event window mentioned above). The similarity between the two extended distances may be calculated using any suitable metric that would be appreciated by a person having ordinary skill in the art upon reading the present descriptions.

In preferred approaches, the extended distances are calculated using Levenshtein distance. This creates a matrix of distance values, among which a minimum can be sought that in turn identifies by how much one or the other sequence should be extended to the left. The same procedure is applied with extensions of the two candidates in another direction, e.g. to the right, resulting in a pair of sequences that is optimal with respect to the chosen metric. The creation of additional clusters follows in an iterative fashion, preferably using only the intervals of the event streams that have not been chosen to be part of an event sequence in earlier iterations.

The extension procedure explained separately for the beginning and ending of subsequences may also be performed in unison, extending both to the left and right before calculating the distance measure, in one approach. However, this approach leads to a large search space, and can only be achieved for very small extensions (3-4 events) without exceeding reasonable limits on available computational power, in accordance with currently available computer architectures and operating environments (such as shown and described above with reference to FIGS. 1 and 2, in several implementations).

Another implementation involves calculating a longest common substring among two subsequences, and to calculate the distance measure only up to the start and end point of said longest common substring, respectively. This approach represents a heuristic to speed up the extension process, and is most advantageously employed for large window sizes and data sets, e.g. where compute time becomes a problem.

In yet another approach, the construction of the distance matrix starts from individual events instead of windows of a certain length. The identification of subsequences is then the process of identifying diagonal or almost diagonal parts of the distance matrix that contain low distance values. It can be useful to imagine the distance matrix as an image whose pixels indicate the similarity between two events—the brighter the pixel, the higher the similarity. A small bright stretch of pixels, say from coordinates $(x_1, y_1)$ to coordinates $(x_2, y_2)$ within the image then indicates that the event sequences from $x_1$ to $x_2$ and from $y_1$ to $y_2$ are similar. This stretch of pixels can be interpreted as a line segment within the distance image. Note that these line segments neither have to be completely diagonal nor do they have to be contiguous, in order to account for slight variations in alignment between two event sequences performing the same task.

The distance between two events can again be measured using various metrics. Preferably, the metric takes into account some context around the individual events, such as a Hamming distance between windows of n events, with n having a small value, e.g. a value in a range from about 1-10, a value in a range from about 2-7, preferably a value of about 5. If the timing information of events is used, dynamic time warping may be used to align the events in order to calculate a Hamming distance. In other approaches, metrics based on auto-encoders may be used, e.g. a WORD2VEC auto encoder using a window length of 5, or a Levenshtein distance may be used.

Using an image processing approach, the distance image can be converted to a binary image using any method of thresholding known in the art, for instance using a global threshold of about 0.5 if the distance metric varies between 0 and 1. Alternative methods, such as Otsu thresholding or adaptive thresholding can also be useful, depending on the data being considered. Any line segment finding algorithm known in the art can then be used to identify the desired segments within the binary distance image. In the simplest case, consecutive pixels on a diagonal indicating small distance or, equivalently, high similarity, can be gathered to form a line segment. In practice, more advanced methods of line segment finding are advantageous, e.g. approaches that use least square fitting, a probabilistic Hough transform, etc. as would be understood by an artisan upon reading the present disclosure.

In a preferred approach, those line segments are then grouped together. Horizontal slices of the distance image are considered. Bright pixels in the slice indicate events that are similar, and the extension of those pixels to diagonal or almost diagonal line segments identify the subsequences that are similar and could be grouped together. Each line segment in the distance image is given an index, and a mapping from vertical coordinates to the set of indices of line segments that cross the vertical coordinate is created. Then, starting at the topmost coordinate, clusters are created, where a cluster extends in the vertical direction as long as the set of subsequences that belong to the coordinate does not change. Each time there is a change point, i.e. each time a subsequence ends at a vertical coordinate, or a new subsequence starts at a vertical coordinate, a new cluster is formed. This results in a minimally accurate soft clustering of subsequences of varying lengths. In various approaches, the clustering is overlapped, and/or soft (or fuzzy) in the sense that each subsequence may be a member of more than one cluster.

The goal is then to create a hard clustering in which each subsequence is a member of one and only one cluster, subject to certain constraints. For well separated sequence patterns, a set of unique clusters may be found. For some cases, the clustering sequences are not unique. For the implementation described immediately below, frequent longer sequence patterns are selected as identified traces.

First, the subsequences in each cluster should be similar in content to each other, given the desired metric—this is the overall quality metric. Second, a certain minimum number of clusters should not be violated, i.e. a number of clusters including subsequence(s) not truly belonging to the cluster should be an amount less than or equal to a threshold minimum number of clusters. Third, it is not required that all subsequences be a member of any cluster. The minimum frequency is used to identify the frequent sequence pattern clusters. Subsequences with frequency less than this threshold are not considered "frequent" sequence patterns, and therefore are not a member of any cluster. Subsequences with frequency higher than this threshold are identified as "frequent" sequence patterns, and are grouped by similarity. In some implementations, these groups/clusters may be overlapped, i.e., some subsequences may be part of longer subsequences or have a non-empty intersection set.

An iterative, greedy algorithm is suitable for solving this step. An exemplary implementation of the iterative, greedy embodiment considers subsequences that are assigned to more than one cluster, and selects a subsequence whose assignment to one of the affected clusters would maximally improve the overall quality metric. That subsequence is then assigned to the appropriate cluster to improve overall clustering quality, and the process is repeated until each subsequence has been assigned to a cluster (i.e. no further subsequences belonging to more than one cluster await clustering).

In addition to assigning individual subsequences to particular clusters, the algorithm may also merge two clusters, in some approaches. This action happens when the members of the two clusters are close together according to the quality metric, so that it is appropriate to view the subsequences as related to the same task.

In additional approaches, it is advantageous to assume that tasks may span multiple applications or application instances, but a given sequence of events pertaining to a given application/instance within the overall event stream typically does not cross task boundaries. According to this assumption, event streams may be segmented into "application traces" and clusters may be generated on the basis of such application traces rather than attempting to identify overall traces corresponding to completion of an entire task. This level of segmentation is advantageous in the absence of ground truths or other suitable known delimiters between tasks, as the traces may be segmented based on express information available within the event stream, e.g. process name, process ID, or other equivalent thereof. Moreover, segmenting tasks into application traces does not negatively impact the ability to identify processes for automation, because the overall sequence of events for any given task is still represented within the application traces, albeit possibly in the form of multiple sequential traces rather than a single sequence of events.

At any rate, application traces may be evaluated and corresponding feature vectors generated using any suitable technique described herein (e.g. autoencoders), and the feature vectors are clustered according to any suitable technique described herein. In such implementations, the resulting clusters of application traces likely represent portions of an overall task.

In one exemplary implementation, building traces from application traces includes the following general procedure.

First, the segmenting process preferably comprises splitting the concatenated event streams into a plurality of application traces, each application trace comprising a sequence of one or more events performed within a same application. The event streams are split using a priori knowledge of the application that generated the events, e.g. as reflected in the "process name" of the exemplary event stream summarized in Table 1, above.

The segmenting process also includes clustering the plurality of application traces according to the sequence of the one or more events performed within each respective application trace; and labeling each of the plurality of application traces to form a plurality of sequences of labels. The labeling is performed according to the cluster to which the respective application trace is assigned, such that the cluster to which the application trace belongs is defined to be its label. It is important to note that the application traces are most preferably clustered only within the same application. Conceptually, in accordance with the exemplary implementation the clusters may be considered analogous to "types of user activities" that occur within the application in question.

The application trace labels are denoted, and the event stream can be written as a sequence of labels, e.g. A1-B3-A7-C2-B6-C1-A3-C7-B4-A7, where the alphabetic character preferably refers to an application and the numerical character preferably refers to a type of trace (or equivalently, cluster ID) within the application. The sequence of labels is searched for recurring subsequences of labels, where long and frequent subsequences of labels are preferred. Starting with a predefined large subsequence length L, recurring subsequences of labels having length L within the set of event streams are identified and counted.

If there are no subsequences that occur with "sufficient" frequency, another search is performed with the next smaller length ($L=L-1$). Here "sufficient" frequency is preferably defined in terms of a number of tasks per person per unit of time, and may be defined according to enterprise policy, e.g. a policy of automating tasks performed greater than or equal to a predetermined number of times per day per person.

Accordingly, in one approach, and in response to determining no recurring subsequences of labels having a length at least as long as L exist within the plurality of subsequences of labels, segmenting involves: decrementing L by a predetermined amount, preferably 1; identifying one or more recurring subsequences within the plurality of subsequences of labels, the one or more recurring subsequences having a length at least as long as the decremented length L; and iteratively repeating the decrementing and the identifying until the decremented length L is equal to a predefined minimum length threshold. It is important to note that the recurring subsequences need not be identical to each other, but rather have at least one matching subsequence of the same length within the overall set of application traces.

Eventually a subsequence of length Li that does have corresponding recurring subsequences of sufficient frequency within the set of event streams will occur. In such scenarios, the particular subsequence that has the highest frequency (there may be several at this length Li above the threshold) is chosen and all occurrences of that subsequence designated as traces. Preferably those parts of the overall sequence corresponding to the highest frequency subsequence are marked as "used" or otherwise made unavailable for further consideration in finding subsequences.

On the other hand, if some subsequences are identified at the given length Li, instead of decrementing L, another search is performed for any other highest frequency subsequences, or optionally a second highest frequency subsequence of length Li. This process is repeated for the same length Li until there are no subsequences for length Li that occur with sufficient frequency. Then Li is decremented as described above and the process proceeds through another iteration until L reaches a specified minimum value. In evaluating empirical data, the inventors discovered an appropriate minimum $L=2$ (i.e. a trace can consist of only two application traces), since a trace consisting of a single application trace is just an application trace.

Accordingly, in a preferred implementation segmenting also involves determining at least one recurring subsequence having a length at least as long as L exists within the plurality of sequences of labels, and in response to determining at least one recurring subsequence having a length at least as long as L exists within the plurality of sequences of labels: identifying, based at least in part on the labels, one or more recurring subsequences of labels within the plurality of sequences of labels, the one or more recurring subsequences of labels having: a length at least as long as a predefined second large subsequence length Li; and a frequency of occurrence within the plurality of sequences of labels greater than or equal to a predefined minimum frequency threshold.

In accordance with the preferred exemplary embodiment described above, it should be noted that after this "combined" clustering/segmentation, clustering is preferably once again performed on the resulting traces, in order to group traces into task clusters.

From this point, segmenting on the basis of application traces may be performed as described above with respect to traces. For instance, the application trace-based clustering may be extended, and/or the clustering may be evaluated after each extension, according to a complexity measure, e.g. based on overall graph complexity according to the number of nodes and edges present in the graph and/or a window-based distance metric. In any event, and as noted above, the application trace clusters are preferably extended as far as possible, e.g. until reaching/surpassing a predetermined overall distance and/or complexity threshold, at which point clustering is complete.

One measure for the complexity when extending a graph in accordance with the inventive concepts presented herein is the average number of edges per vertex in the graph. Extending a cluster in one direction (e.g. to the left in a left-to-right oriented graph) adds variety at the beginning of the graph, which can be measured by how many alternated edges are necessary to capture the content of the cluster. If this "preceding variety" measure goes up more than a threshold, e.g. about 10% of the number of traces covered in the cluster, extension is stopped. In more approaches, extending the cluster in the other direction (e.g. to the right) may add variety at the end of the graph (assuming the extension does not presume or require addition of events precluded by the previously defined steps in the graph) and can be similarly measured. If this "subsequent variety" increases by more than a threshold value, e.g. 10% of the number of all traces in a given cluster), extension in the other direction is preferably ceased.

In particularly preferred approaches, multiple window lengths may be applied to each event stream and the clusters resulting therefrom overlapped to improve overall precision, as would be appreciated by persons having ordinary skill in the art upon reading the instant disclosure.

For instance, not all methods require a pre-determined window length. Certain approaches are "self-selecting" in the way that the longest possible sequences are chosen, e.g. based on a frequency threshold. If multiple windows are used, then the set of window lengths may vary based at least in part on the type of processes that are targeted. For instance, in one experimental implementation the inventors achieved success with lengths of 50, 40, 30, and 20 events. Using an even smaller window size (e.g. about 10) can become counter-productive in certain circumstances, since too many small fragments of processes are picked up and lack independent meaning sufficient to be identified as a unique task type.

Accordingly, in preferred segmentation and clustering approaches, a primary goal is to achieve a clustering in which each cluster corresponds a single, particular user task, with the various representative member traces included in that cluster being instances of the particular user task. User tasks have varying (usually unknown) lengths, but as noted above longer tasks are preferred because automating these using a software robot generally creates a greater improvement to overall enterprise efficiency.

For example, in one illustrative approach a minimum task (window) length is established (e.g. 10 events or so) so as to correspond to the minimum acceptable efficiency improvement. From this starting point, many clusters (indeed, most often too many) are identified as representing a task, but in fact represent only a portion thereof (e.g. the first part of the task). To filter the partial tasks from this set, it is advantageous to systematically increase the window length by any method (e.g. doubling it) and attempting to form/find the same set of clusters using the longer query (window length).

Eventually the window length will become long enough that all repetitive tasks in the data set (preferably, cluster) are shorter in length and no hits are returned. At this point, it is appropriate that the search stop finding clusters, because the trace candidates now include events before and/or after the actual task, which should diminish the corresponding sequence similarity. From these endpoints, the largest window length that yielded clusters is defined as the "maximum task length" T and is preferably chosen for automation of a process representing the most efficient way to accomplish tasks included in the clusters.

Accordingly, in one approach, segmentation and clustering includes determining a maximum task length T from among the concatenated event streams, wherein the maximum task length T is a maximum number of events in any of the concatenated event streams; and identifying a set m of recurring subsequences of events based at least in part on labels assigned to application traces corresponding to the subsequences of events. Preferably, each recurring subsequence in the set m is characterized by a length less than or equal to the maximum task length T.

Once the maximum task length has been determined, it is advantageous to identify suitable subsequences of events, giving preference to longer subsequences by ensuring a shorter subsequence present within a longer subsequence is excluded from the set of suitable subsequences of events. To do so, one may utilize the maximum task length T as a starting point, and identify similar subsequences having the maximum task length T. Such subsequences are flagged within the set of event streams, and preferably removed from further consideration to avoid re-sampling a subsequence falling within the longer subsequence in subsequent iterations of this analysis.

Once appropriate sequences are identified, the window length is reduced, e.g. by a predefined amount such as 10 events, by halving the window length employed in the previous iteration, etc. as would be appreciated by a person having ordinary skill in the art upon reading the present disclosures. Similar sequences having the reduced length are identified and flagged, and the foregoing process is repeated iteratively until reaching a predefined minimum window length, e.g. a value in a range from about 2 events to about 20 events, preferably a value in a range from about 5 events to about 15 events, and more preferably a value of about 5 events, or about 10 events, in various instances.

It should be noted that boundaries other than those separating different applications/application instances may be employed to segment event streams without departing from the scope of the present disclosure. For example, any level of a UI widget hierarchy may serve as a grouping principle/boundary, e.g. where a sequence of events corresponding to a particular element of a UI (such as a window, a button, a field, etc.) may be grouped into a trace (e.g. an "element trace") and clustering performed on this level of granularity.

For instance, in the most general sense, "application traces" as described herein are a type of "subtrace", i.e. a contiguous sequences of events that are assumed not to cross trace boundaries. In various approaches, subtraces can be created by using any natural boundary that occurs within the UI hierarchy. The screens (views, windows, dialogs, tabs, etc.) that reside within an application can be conceptually represented by a tree, where the root is the application level. From the root, a process/user can reach certain screens at the next level of the tree, and so on up to the terminal "leaf" nodes. Subtraces may be defined at any level of this tree. It should also be noted that the farther down the tree, the fewer clusters per a node. For example, on a particular dialog maybe the user can substantially do only one of two types of things (e.g. maybe enter email or phone number).

Leveraging this naturally occurring structure within applications is advantageous, particularly when the applications get bigger and the assumption about application traces not crossing trace boundaries might not hold (e.g. a user spends a significant portion of the day in a single application). In addition, this approach is useful for clustering, as it provides a partial clustering solution (e.g. for application traces, cluster separately for separate applications).

In still more approaches, intermediate structures of sequences may be identified within event traces using a fuzzy measure. Adjacent or nearly-adjacent sequences may be built and extended in a manner substantially similar to that described above for application traces, but using fuzzy labels and seeking similar sequences using a similarity measure. Moreover still, boundaries may be defined based on time span between events within a stream, with the general assumption that events belonging to a trace are typically not separated by pauses longer than a predetermined threshold amount of time, e.g. a time span defined anywhere within a range from about five seconds to about one minute, depending on the nature of the application (for instance pure data entry/manipulation tasks may generally be characterized by shorter gaps between subsequent events than tasks involving interaction with another human, e.g. a chat session.

Of course, in various implementations, any combination of the foregoing segmentation and/or clustering approaches may be employed without departing from the scope of the present descriptions. For instance clusters may be generated first based on UI widget hierarchy, then refined based on clusters defined according to application/application instance, and optionally further refined based on overall event streams.

Referring again to the illustrative implementation shown in FIG. 3, operation 308 of method 300 includes clustering the traces according to a task type. Clustering may be performed, in various approaches, using any technique described herein, without departing from the scope of the presently disclosed inventive concepts. Preferably, the traces clustered according to task type are characterized by: appearing within the recorded event streams at least as frequently as a predetermined frequency threshold; and exhibiting a content similarity greater than or equal to a predetermined similarity threshold.

In any case, once tasks (or equivalently, traces) are identified via segmentation, individual traces are grouped according to task type, preferably using a clustering technique, as recited in operation 308 of method 300.

In essence, the clustering preferably involves sequence clustering, which may implement any number of known algorithms. In particularly preferred approaches, clustering employs a sequence clustering approach that treats segmented traces as sentences in a language characterized by a special vocabulary including all possible events within the traces.

According to this implementation, each event may be considered analogous to a "word" in the language, and thus each trace forms a sentence. Continuing with the language analogy, there may be multiple ways to express the same idea, or accomplish the same task.

In various approaches, events may also or alternatively be considered sequences of words, where each word relates to a specific feature of the associated event (e.g. an application, an event type, an element of a user interface, a hierarchy of an element, etc.) as described herein and as would be understood by a person having ordinary skill in the art upon reading the present descriptions.

In more approaches, events may be encoded using techniques from language modeling. Because noisy words (or impulsive events) may be embedded in any sequence, in order to increase the robustness and accuracy to model each word, the adjacent events and the event itself are used to determine the "sematic meaning" of the event. The context window size is determined by the detection accuracy when used in finding similar events. A context size of 5 is typically advantageous, which means there are two events on the left and right sides respectively. The event itself is then represented by the 5-gram, i.e., five contiguous events.

In still more approaches, events may be considered multi-dimensional features. Known representation techniques such as standard bag-of-words and/or n-gram approaches, optionally using term-frequency/inverse document frequency (tf-idf) concepts, or latent semantic analysis can be used. Alternatively, an auto-encoder such as WORD2VEC can be used to transform each event to a vector in a continuous space. The dimension of the vector is determined experimentally, and is typically between 10 and 300. For one experimental implementation of the presently described inventive concepts, 100 features were determined to be a particularly advantageous dimensionality.

Descriptions of traces may be created using known document representation techniques, and/or auto-encoding techniques that create embeddings within the traces according to deep learning frameworks, e.g. DOC2VEC in one implementation. The traces may be represented as feature vectors, and clustering may be performed according to known techniques such as K-means clustering. However, in such approaches the number of clusters represented by the trace data is not known a-priori. Accordingly, internal quality measure(s) such as a silhouette index may be examined, and a threshold established according to performance of the clustering technique on inspected sample data, in order to establish a suitable value of K. Alternatively, agglomerative clustering methods may be used, and the combination of clusters stopped when the distance between clusters becomes too large, e.g. larger than half the radius of the clusters to be combined.

There are also automated techniques, such as looking for the maximum silhouette score within a given range of K. Another possibility is to use the presence of very small clusters as an indication that K is too large (overfitting) and select a value of K that occurs "on the boundary" of when overfitting starts to occur.

In certain instances, such as where a-priori indicia of task/trace segmentation is available (e.g. in the form of a particular customer or case number, or other static value that may be associated with an event stream based on analyzing the recorded events and/or context thereof), segmentation may not be necessary, and a clustering-only approach may be implemented to group traces. However, in preferred implementations, segmentation and clustering are performed in combination, since such a-priori knowledge is not typically available and even if available may not serve as an appropriate delimiter for separating tasks/traces within event streams.

In another approach, segmentation comprises clustering segments according to element, and wherein the segments clustered according to element comprise one or more events performed with respect to a particular element of a user interface implemented via the computing device; and concatenating some or all of the segments clustered according to element.

Regardless of whether segmentation and clustering are performed separately or in a combined fashion, in operation 310 of method 300, one or more processes for robotic automation (RPA) are identified from among the clustered traces. Identifying processes for RPA includes identifying segments/traces wherein a human-performed task is subject to automation (e.g. capable of being understood and performed by a computer without human direction).

With continuing reference to FIG. 3 and method 300, operation 312 includes prioritizing the one or more identified processes for robotic automation. Prioritizing the processes includes determining the value of automating each identified segment/trace using RPA, and comparing the weight and/or frequency of performing a task by human operators to a weight and/or frequency of performing the corresponding task according to the automated robotic process.

In operation 314 of method 300, the process having the highest priority among all prioritized processes for robotic automation is selected for use in building a RPA model and/or software robot to automate and/or automatically perform, respectively, the corresponding real-world task.

As described in greater detail throughout these descriptions, not all processes for RPA will merit implementing a software robot. Using predefined policies specifying the weight (which may be defined according to any suitable measure, such as time (e.g. person-hours), resources (e.g. compute resources, physical resources, financial resources, etc.) required to perform tasks, and/or frequency of performing various tasks, segments and/or traces suitable for automation may be prioritized and a select number of segments/traces chosen for building RPA models based on overall efficiency improvements conveyed upon the enterprise.

Accordingly, with continuing reference to operations 310 and 312 above, the one or more processes for RPA may be identified and prioritized based at least in part on: a frequency of one or more variants of the clustered traces included in each cluster; and an aggregate weight associated with performing the particular task to which the clustered traces correspond. Moreover, the aggregate weight may include and/or be based on: a number of person-hours expended by humans performing the particular task to which the clustered traces correspond over a predetermined amount of time; an amount of computational resources consumed by humans performing the particular task to which the clustered traces correspond over the predetermined amount of time; and/or an amount of financial resources expended while humans perform the particular task to which the clustered traces correspond over a predetermined amount of time.

Some or all of these parameters may be predefined so that prioritization is an automated process free from human bias/influence.

Of course, in various implementations method 300 may include any number or combination of further additional features, operations, inputs, etc. as described herein, without limitation. In particularly preferred approaches, for example, method 300 may be followed by RPA model building and selection as described hereinbelow.

For instance, in several preferred approaches method 300 may include selectively building a robotic process automation (RPA) model for at least one cluster based at least in part on a frequency of one or more variants of the clustered traces. The RPA model(s) may include or be represented by a directed, acyclic graph (DAG) describing some or all of the traces of a given cluster. Preferably, selectively building the RPA model comprises identifying a minimum-weight, maximum-frequency path from an initial node of the DAG to a final node of the DAG.

In even more approaches of method 300 each event stream comprises a record of the human user's interactions with the computing device over a predetermined span of time. The predetermined span of time may be any suitable interval, and in preferred approaches includes at least an hour, a full work day (e.g. 8 am to 5 pm with one hour lunch break, or any other 8 hour span with or without breaks), etc. Since humans tend to attempt to complete tasks within a day, and the presently described inventive concepts excel at identifying relatively short segments/traces (e.g. 30-100 events), a full work day is a particularly preferred time span for event stream recording.

With continuing reference to event streams and events of method 300, in one approach each event stream comprises a plurality of events; and each event corresponds to: a single interaction between the user and the computing device; and/or any associated actions taken by the computing device in response to the interaction between the user and the computing device. For instance, an interaction may include a keypress, mouse click, gesture, vocal command, etc. as described herein, and associated actions taken by the computer may include any underlying functionality required to perform the user's designated action, such as calling certain processes upon which the application engaged by the user depends, following a hierarchy of UI functionality, etc. as would be understood by a person having ordinary skill in the art upon reading the present disclosure.

In another instance, method 300 involves cleaning the recorded event streams to remove redundant events, erroneous events, and/or irrelevant events, as described in greater detail hereinabove.

In yet another instance, method 300 includes normalizing the recorded event streams, wherein the normalizing involves: identifying equivalent events among the recorded event streams; combining related events into a single event within a given recorded event stream; and/or identifying events having no appreciable impact on performance of the corresponding task.

As will be appreciated by skilled artisans reading these descriptions, cleaning and normalization are optional steps, but when performed may be performed separately or in conjunction without departing from the scope of the inventive concepts presented herein.

In accordance yet another instance, method 300 includes generating a multi-dimensional feature vector for each of the individual traces, where each event is represented by a multi-dimensional feature describing one or more features of the corresponding event. The feature(s) may include any one or combination of: application ID, application name, hierarchical position of an element of a user interface (UI) interacted with during the event, an event type, an event value, a location corresponding to the event, and/or a time elapsed since a previous event occurrence, in various approaches.

The foregoing descriptions set forth various approaches and implementations for identifying traces at various levels of granularity, and clustering such traces according to task type, application, UI element, or other boundaries that would be appreciated as suitable by a skilled artisan, e.g. using fuzzy matching techniques. It will be appreciated that identification of the traces involves identifying processes for RPA, although the resulting clusters of traces may not all be suitable for automation and/or may not convey sufficient improvements to performance of overall tasks to be ultimately included in an RPA model. However, the inventive techniques described hereinabove advantageously allow identification of tasks that may otherwise not be appreciated by a human annotator/curator/manager because the tasks are small or short in nature/duration (e.g. involving only a few inputs such as keypresses and mouse clicks) and are not easily detected as requiring repetitive performance across the enterprise over time.

At any rate, using the determined traces, RPA processes may be identified, such as described above regarding operation 310, and prioritized, such as described above regarding operation 312, preferably according to weight and/or frequency of performance, where weight may be indicated by an overall time spent performing a trace, an amount of funding (e.g. salary, wages, etc.) spent performing a trace, an amount of resources (e.g. physical, financial, computational, etc.) or any other suitable measure that would be appreciated by persons having ordinary skill in the art upon reading the instant disclosure.

Moreover, frequency and weight may preferably be determined directly from the clustering result and/or the recorded event streams, e.g. based on counting a number of times a task (set of traces) appears within the set of event streams, and/or total time spent performing such traces relative to total or average trace performance time (and optionally length, e.g. as expressed in number of events), and the most significant reduction in weight and/or performance time may be selected as the most appropriate process(es) for automation. From this point, models for automating those tasks may be built, evaluated, and optimized, for instance as described in detail herein below.

Building Robotic Process Automation Models

Preferred implementations of the presently disclosed inventive concepts leverage directed, acyclic graphs (DAGs) as a conceptual/organizational model for robotic process automation applications. As understood herein, DAGs are graphs representing one or more, preferably many, traces corresponding to a particular task. The traces may be generated by any number of users and may represent human performance of tasks using computer devices over a predetermined timespan, e.g. a day, a week, a month, etc. in various approaches.

Figure 4:
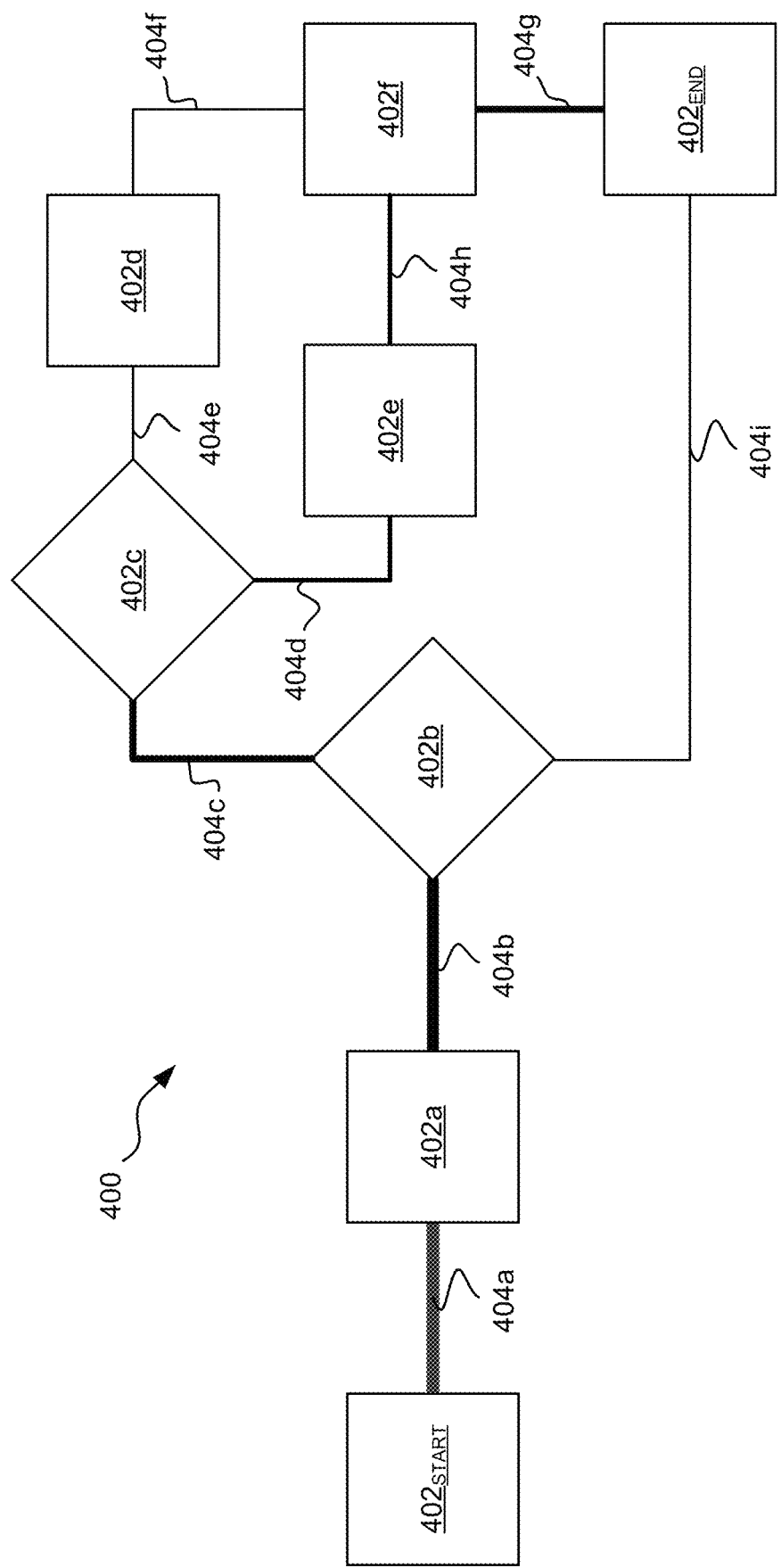
FIG. 4 is a simplified schematic of a robotic process automation model provided in the form of a directed, acyclic graph (DAG), in accordance with one implementation of the presently disclosed inventive concepts.

An exemplary DAG 400 for building an RPA model is shown in FIG. 4, according to one aspect of the inventive concepts presented herein. The DAG 400 generally comprises a plurality of nodes 402 connected by edges 404.

Each node 402 represents an event, e.g. an event of an event stream recorded in operation 302, optionally cleaned/normalized, concatenated in operation 304, and segmented and/or clustered in operations 306 and 308 of method 300 to enable identification of candidate processes for robotic automation in operation 310, prioritization and selection thereof in operations 312 and 314, respectively, of method 300 as shown in FIG. 3 and described hereinabove. Moreover, the event(s) represented by nodes 402 are part of traces belonging to a single cluster generated in operations 306/308 of method 300, in preferred implementations.

Returning to the DAG 400 as shown in FIG. 4, event labels are not unique, such that the same type of event (e.g. copy, paste, enter data value, process image, etc. as described herein and as would be appreciated by a person having ordinary skill in the art upon reading the present descriptions) may occur multiple times within a given DAG 400. However, there are two unique nodes: start node $402_{START}$ and end node $402_{END}$. The task represented by the DAG 400 proceeds unidirectionally from start node $402_{START}$ to end node $402_{END}$, though the particular path from start node $402_{START}$ to end node $402_{END}$ may vary greatly from trace to trace. There are no loops or references to previous events/nodes 402 in DAGs according to the inventive disclosure presented herein.

Edges 404 represent the sequence and relationship of events within the DAG 400. Notably, in accordance with the presently described inventive concepts, there is an edge 404 for each two adjacent nodes 402 in any one of the traces forming the DAG 400. Moreover, for each trace forming DAG 400, there is a path through the DAG 400 from start node $402_{START}$ to end node $402_{END}$.

The DAG 400 may optionally include paths that do not necessarily correspond entirely to a trace generated by a given human user. For instance, in certain implementations where cleaning, normalization, etc. as described hereinabove regarding method 300 are applied to event streams, the resulting traces may omit certain actions performed by the user, and/or may transform the manner in which a human user performed an event or sequence events recorded in the event stream per operation 302 of method 300. For example, the user may perform certain events using a different application, using an API call instead of mouse click, using keystrokes rather than interacting with widgets of a UI, etc. as would be understood by a person having ordinary skill in the art upon reading the present descriptions.

A particularly advantageous aspect of DAGs such as shown in FIG. 4 and in accordance with the presently described inventive concepts 400 is that value and/or frequency information may be encoded directly into the graph. For example, the number of variants including each node may be indicated based on the structure of the DAG 400, e.g. using an overall "coverage" feature as explained in greater detail below, while the number of traces traveling through each edge may be indicated, e.g. by the thickness or style of the line (e.g. dash frequency).

The coverage feature noted above may function as an inclusionary filter to determine which nodes are included in the DAG 400. Coverage should be understood as representative of a DAG's value or contribution relative to the value or contribution of all the traces that could be included into the DAG. For example, a DAG 400 with a coverage of 80% contains the information from the variants representing 80% of the available traces, in one implementation. In another implementation, A DAG 400 with a coverage of 15% contains the information from the variants representing 15% of the overall value of the available traces.

To view the maximal complexity of all traces within a DAG 400, the coverage feature should be set to a maximum value. Conversely, to view only the minimum set of nodes included in all traces forming the DAG 400, the coverage feature should be set to a minimum value. (Coverage may be expressed in any suitable form, but preferably is a normalized scale from 0-1, e.g. percentage.) As the coverage feature is increased, more and more nodes are included in the DAG 400, which may be helpful in understanding all the various ways in which users perform a given task. In one experimental implementation, the inventors found an initial coverage of about 80% is a suitable value to build DAG-based RPA models using clusters generated in operation 306/308 of method 300, and which are built from event streams, e.g. recorded in operation 302 of method 300.

For instance, the most efficient trace may be performed only a few times by a single user, and thus is "buried" in the data and hidden from typical detection. However, using the coverage feature, this trace may be revealed and leveraged to reduce overall weight/improve overall efficiency of performing that task within the enterprise.

Conversely, decreasing the coverage feature may helpfully reduce or eliminate noise, e.g. unrelated events/segments, repetitive events/segments, erroneous events/segments, etc. as would be understood by a person having ordinary skill in the art upon reading the present descriptions.

In another implementation, the coverage feature relates to individual nodes 402 of the DAG 400. In this implementation, the coverage feature functions as an exclusionary filter, removing nodes 402 from the graph based on the coverage filter value. For instance, for a filter value of 80%, the DAG 400 would only contain nodes that contribute to at least 80% of the paths through the graph. This allows a curator to focus on sub-paths with a DAG 400 that represent the most value by setting the coverage filter to a high value. Conversely, by setting the coverage filter to a low value, e.g. 15%, the curator can find efficient ways to implement a task that have not been followed in a majority of the cases.

Those having ordinary skill in the art will appreciate that the DAG 400 shown in FIG. 4 is a simplified version of a DAG in accordance with the presently described inventive concepts. For example, again bearing in mind a moderate size enterprise including about 20 employees working typical hours over a one month period may well generate millions of traces, a given DAG summarizing task performance over this period may have hundreds or thousands of nodes and complex edge structures.

For example, in an illustrative implementation, FIG. 4 may represent a task of saving a data structure/record following entry of new data. Accordingly, the task initiates with node $402_{START}$ and ends with node $402_{END}$, explicitly defined nodes that do not correspond to any event in the task, but rather to initiation and termination points of the task, respectively.

The DAG 400 in accordance with this illustrative implementation represents at least three variants of saving the data structure/record. A first variant includes events represented by nodes 402a, 402b, 402c, 402d, and 402f, and travels along edges 404a, 404b, 404c, 404e, 404f and 404g. A second variant includes events represented by nodes 402a, 402b, 402c, 402e, and 402f, and travels along edges 404a, 404b, 404c, 404d, 404h and 404g. A third variant includes events represented by nodes 402a, and 402b, and travels along edges 404a, 404b, and 404i.

All variants thus include the event(s) of nodes 402a and 402b, and these are considered "essential" to the performance of the task. For instance, in one approach node 402a corresponds to switching focus to an application configured to manipulate the data structure, such as a database application, API, etc. Node 402b corresponds to the user engaging a "Save" button or widget of the application, e.g. via a mouse click, voice command, gesture, etc. In situations where the filename is already designated, simply focusing on the application and engaging the save functionality may be sufficient to accomplish the task, e.g. in accordance with the third variant described above.

In other situations, the filename may not be designated or the user may wish to change/update the filename for the data record/structure and/or re-use a previously designated filename (e.g. updating the file, but not the name itself). Accordingly, and following the second and third variants discussed above, the user may additionally engage a File name: element of a Save dialog of the application as reflected by node 402c. Again, the user may engage the element via a mouse click, gesture (e.g. tap), voice command, etc. in various approaches.

From here, the user may designate the desired file name in various ways. For instance, in one approach a user may type a desired filename using keypress(es) to designate, e.g. "filename.dat" to overwrite an older version of the data record/structure, e.g. as represented by node 402d. To confirm the desired filename, the user engages a "Save As" button or widget of the application in an event represented by node 402f.

On the other hand, the user may select an existing filename from the Save dialog window as represented by node 402e, according to the third variant. The selection may be performed using a mouse click, gesture, voice command, or other suitable input. Again, to confirm the desired filename, the user engages a "Save As" button or widget of the application in an event represented by node 402f.

Accordingly, the second and third variants represent substantially similar paths to the end node $402_{END}$, with the difference being the manner in which the desired filename is provided to the application. In practice, an administrator may wish to collapse the second and third variants into a single path based on the relative efficiency benefits of performing the task according to each unique approach. For purposes of simple illustration only, these closely related paths are included separately in the DAG 400 shown in FIG. 4. Skilled artisan will readily appreciate the DAG 400 shown in FIG. 4 and described hereinabove is an extremely simplified implementation of the presently disclosed inventive concepts, and this implementation should not be considered limiting in any way on the scope of tasks capable of being automated using RPA models and DAGs.

As noted hereinabove, one advantage of DAGs is the ability to represent frequency information directly in the graph. As shown in FIG. 4, this is represented by the relative thickness of each edge 402a . . . 402i. Again, using the foregoing simplified scenario, assume the DAG 400 represents a cluster of 5,000 traces, and all traces fall under one of the three variants described above. Since all variants include nodes 402a and 402b, the thickness of edges 404a and 404b is maximal, and represents all 5,000 traces in the cluster. The first deviation occurs at node 402b, where the first and second variants proceed along edge 404c while the third variant proceeds along edge 404i. Edge 404i represents a direct progression from engaging the Save function of the application to the end of the task $402_{END}$, but is the least frequently taken path. This may be because users typically do not open a previous version of a data structure/record to make changes, but rather open a new application instance and enter data into the new instance, then overwrite the previous version via the Save dialog, as described above regarding the first and second variants. For illustrative purposes, assume approximately 500 (10% of) users open an existing application instance (file) in accordance with the third variant, while 4,500 (90% of) users open a new instance, putting these paths in line with the first or second variants. Lines for edges 404i and 404c exhibit relative thicknesses, accordingly.

Upon engaging the Save As dialog, about 66% of the new application openers select an existing filename from the window (node 402e), while the remaining 33% manually enter text via keypresses (node 402d). All new application openers then proceed to node 402f, where the "Save As" button is engaged to confirm the filename. Thus edge 404g exhibits the same throughput as edge 402c, i.e. 4,500 traces.

A curator observing DAG 400, or an automated process of generating RPA models, may further improve upon the efficiency of the corresponding save task by collapsing the DAG to exclude one or more of the first, second, and third variants. Whether or not to pursue this change in the DAG depends on factors such as weight, etc. as may be defined in an enterprise policy and as are described in greater detail elsewhere herein. Notably, the DAG 400 of FIG. 4 illustrates the scenario where a least-followed path (least frequent variant) may nonetheless be a most efficient path to completing a task (since the third variant has the fewest nodes and corresponding operations to perform, both the human and computational weight are minimized). Moreover, since the task is relatively simple (saving a file), potential RPA processes may go unappreciated by conventional recording techniques. Again, the presently described inventive concepts represent an improvement to the function of computers by enabling automation of tasks that otherwise would go unnoticed by human observers of an enterprise's day-to-day activities.

Continuing now with the notion of building DAGs from RPA mining data obtained and analyzed in accordance with method 300, as described hereinabove this process involves identifying and assigning a weight to each trace in each cluster generated during the RPA mining phase. The weight may reflect the frequency of the trace within the cluster, the weight of the node relative to each trace including the node, etc. as would be understood by a person having ordinary skill in the art upon reading the present descriptions.

Variants, as defined hereinabove, may be considered synonymous with a particular trace and associated weight of a DAG, in accordance with the inventive concepts described herein. Conceptually, there are as many different graphs possible for a cluster generated in operations 306/308 of method 300 as there are variants represented in the cluster, and the DAG for a given RPA model represents the aggregation of a given number of variants (e.g. as dictated by the coverage threshold used to define the DAG, user manipulation, etc. as described herein).

Given that a DAG for a particular RPA model represents the aggregation of a given number of variants, a challenge exists with respect to how individual segments/traces (sequences of event) should be merged to form a DAG in accordance with the presently described inventive concepts.

In one approach, alternate paths may be created from the aggregation of variants, with each variant beginning at an explicit start node and ending at an explicitly defined end node, e.g. as shown in FIG. 4 via start node 402$_{START}$ and end node 402$_{END}$. All variants may be represented within the DAG as a distinct path from the start node to the end node. However, this approach is undesirable because nodes with identical functions are not merged, leaving unnecessary additional complexity in the resulting RPA model and sacrificing an opportunity to improve efficiency of task performance.

In another approach, a trie algorithm with suffix/infix merging may be employed to merge sequences of events. As will be understood by skilled artisans reading the present descriptions, trie techniques are frequently used to represent dictionaries in a natural language program, and operate using a minimal deterministic finite state automaton to carry events on edges of the DAG. While trie algorithms are well suited search tree algorithms, the resulting graphs tend to grow too large for application in the context of RPA mining, because only paths that correspond to known, existing variants are retained in the ultimate graph.

In yet another approach, RPA models may be built from process(es) selected in operation 314 of method 300 based on optimality criteria. Advantageously, since RPA models need not (and preferably do not) exactly replicate any given user's trace or performance of a particular task, it is not necessary to restrict the DAG 400 to only paths that correspond to actual variants obtained from the event streams. In fact, it is advantageous to define paths that, while substantially similar to a given (e.g. most efficient) human-produced variant, do not match any human-produced variant in the event streams. The particular advantage is that compactness of the DAG 400 is preferred over exactness. For instance, if two variants share a middle operation but have different start and end sequences, it is preferred to present the DAG as a single graph with four unique paths where the middle portion of nodes belongs to all four paths instead of a graph with exactly two paths where none of the nodes are shared among paths. Accordingly, for optimality criteria-based techniques for building RPA models, the most efficient model may be accomplished by minimizing the number of nodes included in the DAG 400 (minimizing the number of events in a given trace), then minimizing the number of edges within the DAG 400 (simplifying the structure of the DAG to remove redundant, erroneous, misinformative, unrelated, etc. events and/or combine sequential events into a single event).

The mechanics of merging, regardless of which approach is adopted, are nontrivial. While one could leverage existing graph merging algorithms, in some implementations, these algorithms are not configured for the particular challenge of discovering RPA processes and generating RPA models therefor to improve efficiency of task performance within an enterprise. Accordingly, existing graph merging algorithms are to be understood as a suitable but inferior implementation of the inventive concepts described herein.

Instead, and particularly where the RPA models are represented by DAGs, an A* search algorithm may be employed to merge traces/events and keep track of resulting weight of an overall DAG 400. Preferably, the weight is given by the optimality criteria, which govern at least the weight of adding nodes and edges to the DAG. For instance, in various approaches the weight of adding a node may be a value in a range from about 0.25 to about 2.25, preferably a value in a range from about 0.5 to about 1.75, more preferably a value in a range from about 0.75 to about 1.25, and most preferably a value of about 1.0, while the weight of adding an edge may be a value in a range from about 0.01 to about 1.0, preferably a value in a range from about 0.05 to about 0.5, more preferably a value in a range from about 0.075 to about 0.25, and most preferably a value of about 0.1.

In preferred implementations, aspects of the rest weight estimate may be given by evaluating the length of a current variant with respect to the graph. If the variant has length n and the graph length m, and n>m, then adding the variant to the DAG 400 will require adding new node(s) to the existing graph and produce errors.

Moreover, aspects of the rest weight estimate may be given by evaluating the number of errors that must be made in order to complete the graph. For instance, the set of differences between events in the remainder of the graph and the remainder of the variant may be an optimistic estimate of the weight of adding a variant.

Accordingly, and with continuing reference to using optimality criteria to build RPA models, in preferred implementations the graph building process includes merging variants by starting with a linear graph defining a path from start to end, preferably the shortest path (simplest variant) or the variant that covers most of the value of the DAG 400. Additional variants are added sequentially, which may occur in several different manners. First, variants may be added according to overall coverage/value, such that the graph represents the maximum value density of all variants within the cluster. Second, variants may be added according to complexity (e.g. number of nodes, edges, distance, etc.) such that the graph represents the most compact path available for a particular cluster. Third, combinations of the above may be employed without limitation.

Of course, in various approaches RPA models may be built using any combination of the foregoing techniques, as well as any equivalent(s) thereof that would be appreciated by persons having ordinary skill in the art upon reading the present disclosure. Ultimately, the variants are merged (preferably sequentially) into the DAG 400, resulting in a larger graph that remains optimal with respect to the optimality criteria.

Model Selection

The techniques discussed immediately above relate to generating a set of RPA process models based on data recorded, and processed in accordance with method 300. Software robots for these models could be generated automatically, but it is not immediately clear how to handle branching in the model graphs. For instance, it can be difficult to determine whether branches in the graph reflect different ways of performing the same task, represent a break in task performance and shift to performing another task, indicate that the user has assessed an issue, decided on it, and the subsequent events represent different actions based on that decision, and other context useful to defining the operation of a software robot.

Moreover, it is not clear that all models should be implemented as robots. For instance, there is an administrative weight associated with generating each robot, and only tasks that are sufficiently valuable should be candidates for software robot generation. Furthermore, it is not clear what the mechanism would be to invoke a given robot from the event stream or models alone. Thus, the model building system should present models that were mined to an administrator who then decides which models to work with and ultimately to convert into a software robot. This decision process may vary from enterprise to enterprise, but is generally and predominantly based on: (1) the value of a robot, e.g. in terms of person-hours saved, financial and/or computational resources preserved, etc.; (2) which applications are used in performing a task, in various approaches. For instance, it may be advantageous for an enterprise to focus on a few critical applications, e.g. to harmonize/streamline core services/functionalities such as an expensive cloud API.; (3) the nature of the resources used to perform a task, since it may be advantageous to focus on particular resources in the context of a given task. For example, an enterprise wishing to maximize discounts/benefits associated with a task such as bill payment may focus on automating corresponding, e.g. accounts payable tasks, so that invoices are processed more quickly and the enterprise becomes eligible for additional discounts/benefits; and (4) the time frame during which event streams were recorded. For example, in seasonal enterprises very different resource demands may exist at different times of year, and it may be advantageous to employ automation during e.g. the busiest time of year.

It must be noted that the selection of resources, applications, and time intervals changes the models. Specifically, since there are different sets of streams available after changing the constraints, the models are preferably recomputed for accuracy. Accordingly, a model that has already been worked on by a curator/administrator should preferably be guarded from those changes to preserve the desired functionality of the corresponding software robot.

Ultimately, while RPA model building may be automated using various techniques and based on various criteria set forth herein, some or all of which may be predefined by the enterprise implementing the RPA model, it should be appreciated that the most effective/efficient implementations of RPA models in accordance with the inventive concepts described herein are produced, or at least reviewed, by a human. The human may verify a given path is indeed optimized with respect to the corresponding task, and/or improve upon the efficiency of a given RPA model. For example, the human-driven decision-making process may be facilitated by contextual information (e.g. screenshots, UI hierarchy information, etc.) which allows identification of task boundaries in a more accurate manner than from the event stream data alone, without human review.

Additional Aspects and Implementations

Those having ordinary skill in the art will appreciate, upon reading the present disclosure in full, that the inventive concepts presented herein have a wide variety of implementations and may benefit from the inclusion of additional or alternative aspects. Several such implementations are presented below.

It shall be understood that the illustrative implementations are part of the inventive concepts presented herein, and are in no way limiting on the scope of the present disclosure.

It will furthermore be clear that the various features of the foregoing systems and/or methodologies may be combined in any way, creating a plurality of combinations from the descriptions presented above.

It will be still further appreciated that implementations of the present invention may be provided in the form of a service deployed on behalf of a customer to offer service on demand.

Automated, Interactive Agents

In one general approach, the presently described inventive concepts are particularly applicable to creating and improving automated, interactive agents configured to interact with humans in various contexts and provide assistance and/or guidance to humans, especially in the context of assisting humans to obtain a particular service or product, or accomplish a particular task. One exemplary form of automated, interactive agents is an intelligent "chat" agent configured to facilitate human users interacting with an online (or even telephonic) support system, such as a "call center."

In various implementations, automated, interactive agents may be employed in an operating environment/architecture 100 such as shown in FIG. 1, and may operate on one or more workstations of the architecture, such as workstation 200 shown in FIG. 2 Furthermore, automated, interactive agents may be configured to perform a specialized version of method 300 as shown in FIG. 3.

For instance, various users may use a device such as user devices 116 as shown in FIG. 1 to navigate to a web page or other network resource, which may be hosted by one or more servers 114 and/or networks 104, 106, 108. The user devices 116 may be workstations such as workstation 200, mobile devices such as smartphones, tablets, personal digital assistants (PDAs), etc. in various approaches. Such user devices, as shown in FIG. 2, include an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as virtual reality googles and/or handheld controllers, a touch screen (e.g. for receiving/detecting gestures) and a digital camera (not shown, but also optionally for receiving/detecting gestures, recording video, etc.). Such components facilitate the collection of user input and generation of event streams.

In any event, users may navigate to an application and/or interface, and interact with the application and/or interface, said interactions comprising an event stream which may be recorded in any manner as described hereinabove with reference to operation 302 of method 300. For instance, the user may interact with a human or automated agent to assist the user in navigating through the various resources provided via the application/interface, selecting appropriate/desired resources, obtaining/modifying/terminating various services, sharing and/or obtaining data, etc. in myriad applications that will be appreciated by a person having ordinary skill in the art upon reading the present disclosure. Recorded event streams may be stored, preferably in one or more tables of a database, in a peripheral 120 configured for data storage, e.g. a storage unit 220 as shown in FIG. 2.

The illustrative interactive, automated agent implementation of the presently described inventive concepts, as with many other implementations, is unique primarily with respect to the nature of the inputs provided by the user and appropriate responses defining the various event streams. In the context of a "call center," for example, it may be appropriate for an interactive, automated agent to generate one or more automated introductory communications to provide context to the user based on the user's desired goal/task to be performed. In addition, upon receiving various responses from the user, the automated agent may provide appropriate replies, preferably including suitable options from among which the user may choose to ultimately obtain the desired goal/perform the desired task.

With brief reference to suitable task types, in various approaches examples of tasks are numerous. Essentially, any circumstance in which an interactive prompt or window, such as a "Chat with a Customer Representative" window, or the like, appears on a web site, an automated RPA agent could provide efficiency improvements to the resulting interaction and associated processes. Exemplary processes, without limitation, include onboarding of various types (bank accounts, insurance, utilities, etc.), informational tasks (car shopping), citizen support (police, permitting services, trash collection), and equivalents thereof that would be appreciated by a person having ordinary skill in the art upon reading the present disclosures.

A significant technical improvement conveyed by employing RPA agents in such situations is avoiding additional (especially human-driven) programming efforts in order to automate a previously human-driven process. For instance, assume there is a service representative (or other human agent) servicing the interaction, and the service representative (or other human agent) understands what users wish to accomplish from the interaction. The service representative (or other human agent) may then use tools (provided, e.g. by applications and/or interfaces available to the service representative, e.g., via a server, on their desktop, mobile device, etc. in various approaches) to provide appropriate assistance to the user. In accordance with the inventive, automated RPA agents and processes described herein, once an RPA agent is configured to provide such assistance based on recorded event streams and RPA process identification/model building techniques described herein, no additional programming work is necessary. An RPA robot can execute the same applications, only without the need for human assistance. Thus, the line of applications stay the same, but the manner of operating said applications is automated and correspondingly, previously required human efforts are avoided. This translates to an overall improvement in enterprise efficiency.

Regardless of task type, preferably event streams are cleaned and/or normalized, e.g. to minimize noise and/or misinformative signals as described hereinabove regarding FIG. 3, and optionally to group together event streams generated by users seeking to accomplish the same task via interacting with the human or automated agent. For instance, event streams corresponding to users seeking to obtain a particular service are preferably grouped and separated from event streams corresponding to users seeking to post data to a project, similarly event streams corresponding to users seeking to purchase or return a particular product are preferably grouped and separated from event streams corresponding to other task types.

Such cleaning and normalization may require a priori knowledge regarding the nature of recorded event streams, which may be acquired via preliminary guidance/filtering implemented via the interactive agent. For example, users may be required/requested to indicate the particular task they wish to accomplish and streams filtered based on the users' responses. Moreover, such responses may be limited to a predefined set of possible responses defined, e.g., by a system administrator of environment/architecture 100, workstation 200, etc., or other equivalent entity. However, cleaning and/or normalization may be performed in any suitable manner as described herein, and should be understood as an optional operation, as described above regarding FIG. 3.

Where a priori knowledge is not available, segmentation and/or clustering may be utilized to attempt to determine task types, such as described hereinabove regarding operations 306 and 308 of method 300. In such approaches, the segmentation and/or clustering leveraged to filter event streams according to task type are or correspond to operations 306 and 308 as performed by one or more previously-implemented automated agents, such as will be described in greater detail below regarding "Bootstrapping RPA Knowledge." Accordingly, skilled artisans will appreciate that the presently described automated, interactive agent concepts are combinable with techniques leveraging prior knowledge gleaned from robotic process automation.

Whether or not the recorded event streams are cleaned and/or normalized, over time event streams generated by users are preferably concatenated as described hereinabove and for reasons substantially as stated with regard to operation 304 of method 300.

Concatenated event streams are subjected to a segmentation and/or clustering analysis, as reflected above via operations 306 and 308 of method 300. Preferably the concatenated event streams are subjected to a combined/hybrid segmentation and clustering technique as described hereinabove regarding FIG. 3.

Indeed, in the context of a call center or other typical scenario suitable for implementation of an automated, interactive agent, segmentation of event streams (and corresponding traces) is a much simpler process since the tasks can be identified according to user, and in some cases according to individual interactions with the online marketplace (whether by the same user or different users). Accordingly, segmentation, clustering, and model building/modification/selection may be performed substantially as described hereinabove regarding FIGS. 3 and/or 4, in various approaches. Segmentation and clustering may employ any techniques described with reference to operations 306 and 308 of method 300, while model building, modification, and/or selection may employ any aspect of the exemplary process described hereinabove with reference to FIG. 4 and preferably utilizes a DAG similar to DAG 400 shown in FIG. 4.

In one specific, nonlimiting example, a user wishes to obtain a service, modify terms of an existing service to which the user has access, and/or terminate an existing service to which the user has access. A service provider offers and sells services using an online marketplace application/interface hosted by one or more servers and/or networks, e.g. such as servers 114 and/or networks 104, 106, 108 of FIG. 1. The user accesses the online marketplace and in response to detecting the user's presence within the online marketplace, interactions between the user and the application(s)/interface(s) of the marketplace are recorded, such as described above regarding operation 302 of method 300. Whether based on training data and/or previous RPA knowledge, an automated, interactive agent offers to assist a user with obtaining the service, modifying the terms of existing service, and/or canceling service.

Preferably, the automated agent makes the aforementioned offer via a chat interface of the online marketplace, and furthermore makes the offer in response to detecting/determining, based at least in part on input(s) provided by the user, that the user wishes to engage in a task represented by an existing RPA model.

More preferably, the RPA model was generated based on training data collected from mock interactions between users and the online marketplace, and/or real-world data collected during previous user interactions and processed to identify processes for robotic automation such as described hereinabove regarding method 300. Accordingly, the existing RPA model was generated using event traces recorded substantially in accordance with operation 302, optionally cleaned and/or normalized, then concatenated in accordance with operation 304 of method 300. Concatenated event streams are segmented and/or clustered substantially as described above regarding operations 306 and 308, most preferably according to a combined/hybrid segmenting and clustering approach. From among the resulting clusters, one or more candidate processes for robotic automation of service provision, modification, and/or cancelation are identified, e.g. per operation 310 of method 300, and prioritized (e.g. according to overall cost/weight of performance, frequency of performance, etc. as described in greater detail elsewhere herein), e.g. per operation 312. From among the prioritized candidate processes, at least one is selected for automation in accordance with operation 314 of method 300. The selected process(es) may then be used to generate an RPA model substantially as described above with reference to FIG. 4.

Regardless of the particular manner used to generate the RPA model, the interactive, automated agent utilizes the model (preferably in the form of a DAG 400 such as shown in FIG. 4 and described hereinabove) to guide the user through the application/interface and obtain the desired service/modification/cancellation. The agent may suggest a set of operations to be performed by the user to minimize the user's amount and time of interaction with the application/interface, so as to streamline the user's overall experience and without requiring human attention/effort.

Accordingly, in one illustrative implementation identifying processes suitable for creating an automated, interactive agent in accordance with the presently described inventive concepts may involve performing operations substantially as described hereinabove regarding method 300.

For instance, in one approach identifying processes suitable for creating an automated, interactive agent includes recording event streams of users interacting with an online marketplace configured to facilitate obtaining services and/or products, modifying services and/or products, and/or canceling/terminating services or returning products. The event streams may be recorded in accordance with operation 302 of method 300, and preferably include a user's indication (whether provided in textual, auditory, visual format, combinations thereof, or otherwise) of the service(s) and/or product(s) of interest, as well as whether the user desires to obtain, modify, or cancel/return such service(s) and/or product(s). Preferably, entire turns of conversation, and associated actions taken by each party to the conversation, are independently considered individual events within the event stream. Advantageously, such events are closely linked in terms of time of occurrence.

A plethora of such user interactions are recorded, along with subsequent actions taken by the user and/or a service representative with which the user interacts, e.g. which pages of a website the user navigates to, which elements of each page the user interacts with, corresponding actions/requests by the service representative to the online marketplace UI(s)/application(s), etc.

These event streams may be concatenated, e.g. in accordance with operation 304 of method 300. Optionally, but preferably, the event streams are cleaned and/or normalized prior to concatenation in accordance with operation 304.

As noted above, in the context of a call center or the like segmentation, e.g. per operation 306 of method 300, is relatively simple since event streams are easily distinguished according to user.

Clustering, process identification, process prioritization and process selection per operations 308-314 may be performed substantially as described hereinabove with reference to method 300 and FIG. 3.

In another example, a user may wish to submit a request for help/support with an existing service or product with which the user is having difficulty. The manufacturer/service provider may host, e.g. using one or more servers such as servers 114 of architecture 100, an online help system application/interface for customers. Substantially as described above regarding obtaining/modifying/canceling a service, one or more processes for robotically automating user support (e.g. a "helpdesk" model) are identified, e.g. per FIG. 3 and corresponding descriptions, while an RPA model for supporting users with offered products/services is generated in accordance with FIG. 4 and corresponding descriptions.

In still yet another example, a user may wish to plan a travel route based on one or more criteria such as permitted speed, traffic conditions, and/or fuel price. The user may engage in a route planning task facilitated by one or more automated, interactive agents with knowledge of current traffic laws/patterns and fuel prices as determined from training data and/or previous interactions with this and/or other users.

Various implementations similar to those described immediately hereinabove will become apparent to skilled artisans upon reading the present disclosure in its entirety. It shall be understood that such additional implementations and extensions of the fundamental inventive concepts presented herein may be employed without departing from the scope of the present disclosure.

Bootstrapping RPA Knowledge

Another advantageous aspect of the presently described inventive concepts for identifying processes for RPA and implementing automated models generated using RPA is the ability to leverage prior knowledge obtained/generated from previously-generated RPA models (also referred to as "robots" or "software robots").

Similarly, feedback from users following interaction with a given RPA model may be utilized to modify and preferably optimize the performance of current/future models configured to automate the same or similar task types. Such user feedback may relate, in various instances, to speed of performance, accuracy, convenience or ease of interacting with the model, etc. as would be appreciated by a person having ordinary skill in the art upon reading the present disclosures.

In various approaches, bootstrapping knowledge from previously-generated robots, such as interactive, automated agents as described above, enables the process of automating tasks to be intelligent and responsive to changes in the system, user behavior, etc. over time. For instance, different data may be used or required to accomplish a given task at different times or in different contexts. As these changes emerge, the recorded event streams reflect the changing trends and may be used to generate new models for RPA that more accurately reflect current circumstances.

For example, and with continuing reference to the exemplary "road trip" planning described above, a user may wish to conduct an annual trip between two common destinations, and may wish to update the route planned each year to account for changing conditions, e.g. due to construction, changes in traffic laws, weather (especially if the user is traveling during different seasons from year to year), global oil exchange fluctuations, fuel supply conditions, etc. as would be appreciated by a person having ordinary skill in the art upon reading the present disclosure.

In order to provide the most accurate model for an upcoming road trip, an RPA model may be generated using knowledge obtained by prior generations of the road trip RPA model, optionally including applying a weighted distribution to the prior knowledge according to recency. For example, knowledge gathered during more recent trips may be weighted more heavily than older knowledge, since it is more likely that certain conditions such as construction, fuel prices/supply, etc. are reflected by recent trends/states than more historical data, which may instead be more informative regarding long-term trends such as climate and overall traffic conditions/patterns.

Accordingly, in some implementations of FIGS. 3 and 4, event streams used to identify processes for robotic automation, to generate and/or manipulate RPA models, manipulate models, etc. may include knowledge used by and/or obtained by previously-implemented software robots.

One such piece of knowledge that is particularly useful in identifying processes for robotic automation and generating RPA models is the cost, or weight, of performing the corresponding task manually versus automatically using a computer. Whereas users attempting to generate a RPA model de novo from training data (i.e. event streams recorded in operation 302 of method 300) may not have access to corresponding cost information, and/or may have only a partial understanding of the overall cost of manual performance versus automated performance of the task, users with access to previously-implemented RPA models will likely have insight into the precise amount of resources required to perform any given set of operations in the past. This information may be used to estimate the amount of resources required to automate various tasks, as well as to facilitate the decision whether to implement a given RPA model in a given context, e.g. based on estimated efficiency gains from previous models'/robots' performance.

Additional aspects of bootstrapping prior RPA knowledge enable and/or facilitate disambiguation among similar inputs and/or event streams, improving overall accuracy of RPA models generated in accordance with the inventive concepts described herein.

A still further benefit of bootstrapping prior RPA knowledge is to facilitate, and ideally simplify, the process of building and selecting models, e.g. as described hereinabove with reference to FIG. 4 and DAG 400, from the process(es) identified in operation 314 of method 300.

For instance, in general the relationship between events in an existing RPA model and steps performed by a corresponding software robot are known. Accordingly, this knowledge may be leveraged to simplify the process of creating new RPA models and/or robots, e.g. by proposing particular steps/operations that have been utilized efficiently in previous implementations. For example, assume data representing various user traces all includes a common subtrace of operations, and this subtrace is performed in a manner particularly convenient for human operators but ultimately inefficient given the capabilities of an automated software robot. A previously-generated robot may have been configured to substitute the convenient, but inefficient subtrace with a more efficient set of events/operations, and this knowledge may be used to similarly substitute the same subtrace when appearing in future traces (e.g. because the convenience of performing the subtrace in the less efficient manner has not diminished and remains preferred from the human operator's perspective).

In another instance, prior knowledge from existing robots may be leveraged by providing a blueprint or scaffold upon which to build future implementations of the robot(s). For example, a set of essential or necessary operations/events may be identified from the existing robot, and corresponding events identified within clusters of traces produced per method 300, above. These corresponding events may be used to build a partial RPA model, and/or may be used to filter out traces not including such events from being included and/or otherwise influencing future RPA models and corresponding robots.

In still more instances, existing RPA models and corresponding software robots may be employed to align events occurring within a given model with the steps ultimately performed by the robot, all while seeking to maximize efficiency of the overall process corresponding to said events. For example, a robot may substitute certain operations for equivalent, more efficient operations such as substituting a series of mouse clicks for system API calls, which can be invoked and executed with greater efficiency than the corresponding series of mouse clicks. Of course, other forms of substitution and other ways of improving efficiency may be employed without departing from the scope of the presently described inventive concepts.

Accordingly, in various approaches previously generated RPA models and corresponding robots maybe leveraged for insight regarding which nodes of a trace are likely to be removed from the graph/DAG representing the final automated process (e.g. DAG 400 as shown in FIG. 4). For example, nodes corresponding to redundant and/or inefficient operations may be regularly removed from robots/ models generated in a certain context/application, and this trend may be leveraged, e.g. as a rule, to influence the operation of future robots/models generated in the same or similar contexts/applications.

RPA models and corresponding robots may similarly be leveraged for insight regarding which nodes of a trace are likely to be reinforced in the model building process, e.g. nodes which are necessary and cannot be substituted to accomplish the overall task represented by the trace, nodes which represent a more efficient manner of performing a given operation/subtrace, etc. as will be appreciated by persons having ordinary skill in the art upon reading the present disclosures.

Preferably, identifying nodes that are likely to be removed, reinforced, and/or grouped is based on the context in which these actions have been previously undertaken. In other words, if a given pattern of events appearing in a current/future trace was treated in a particular manner under similar circumstances in the past, it is reasonable to treat the pattern the same way unless current/future circumstances are significantly different from those in which the prior handling decision was made.

Furthermore, user feedback over time may be utilized to bootstrap confidence in treating future sequences of events in a similar manner. For instance, over time various series of operations may be proposed in response to traces including particular sequences of events. Where the sequence of events may be performed more efficiently using an alternative set of operations, the model building process may propose such a substitution to a human user for confirmation/negation/modification.

For example, if a particular substitution, grouping, etc. of events is historically confirmed with substantial frequency (for instance above a predefined confirmation threshold, e.g. a value in a range from about 0.8 to about 1.0 on a scale from 0 to 1, preferably a value in a range from about 0.9 to about 1.0, and most preferably a value of at least about 0.95 (again on a scale from 0 to 1), in various approaches), then this may indicate a strong preference for making similar substitutions in the future, potentially even without seeking user confirmation.

On the other hand, if a particular substitution, grouping, etc. of events is historically negated or modified with substantial frequency (for instance above a predefined negation/modification threshold, e.g. a value in a range from about 0.5 to about 1.0 on a scale from 0 to 1, preferably a value in a range from about 0.75 to about 1.0, and most preferably a value of at least about 0.9 (again on a scale from 0 to 1), in various approaches), then this may indicate a strong preference for not making similar substitutions in the future, or at least for seeking user confirmation with respect to such substitutions.

Exemplary aspects of the presently described inventive Concepts include:

Concept (a) A computer-implemented method for identifying one or more processes for robotic automation (RPA) includes: recording a plurality of event streams, each event stream corresponding to a human user interacting with a computing device to perform one or more tasks; concatenating the event streams; segmenting some or all of the concatenated event streams to generate one or more individual traces performed by the user interacting with the computing device, each trace corresponding to a particular task; clustering the traces according to a task type; identifying, from among some or all of the clustered traces, one or more candidate processes for robotic automation; prioritizing the candidate processes; and selecting at least one of the prioritized candidate processes for robotic automation.

Concept (b) The computer-implemented method of concept (a), wherein each event stream comprises a record of the human user's interactions with the computing device over a predetermined span of time.

Concept (c) The computer-implemented method of concept (a), wherein each event stream comprises a plurality of events; and wherein each event corresponds to: a single interaction between the user and the computing device; and any associated actions taken by the computing device in response to the interaction between the user and the computing device.

Concept (d) The computer-implemented method of concept (a), further comprising cleaning the recorded event streams to remove redundant events, erroneous events, and/or irrelevant events.

Concept (e) The computer-implemented method of concept (a), further comprising normalizing the recorded event streams, wherein the normalizing comprises: identifying equivalent events among the recorded event streams; combining related events into a single event within a given recorded event stream; and/or identifying events having no appreciable impact on performance of the corresponding task.

Concept (f) The computer-implemented method of concept (a), further comprising selectively building a robotic process automation (RPA) model for at least one cluster based at least in part on a frequency of one or more variants of the clustered traces.

Concept (g) The computer-implemented method of concept (f), wherein each RPA model comprises a directed, acyclic graph (DAG) describing some or all of the traces of a given cluster.

Concept (h) The computer-implemented method of claim (g), wherein selectively building the RPA model comprises identifying a minimum-weight, maximum-frequency path from an initial node of the DAG to a final node of the DAG.

Concept (i) The computer-implemented method of concept (a), wherein the segmentation comprises: clustering one or more segments according to application type; and concatenating some or all of the segments clustered according to application type, and wherein each segment comprises a sequence of one or more events performed within a same application.

Concept (j) The computer-implemented method of concept (a), wherein the clustering further comprises generating a multi-dimensional feature vector for each of the individual traces, wherein each event comprises a multi-dimensional feature describing one or more features of the corresponding event, the one or more features comprising: an application ID, an application name, a hierarchical position of an element of a user interface (UI) interacted with during the event, an event type, an event value, a location corresponding to the event, and/or an amount of time elapsed since a previous event occurrence.

Concept (k) The computer-implemented method of concept (a), wherein traces clustered according to task type are characterized by: appearing within the recorded event streams at least as frequently as a predetermined frequency threshold; and exhibiting a content similarity greater than or equal to a predetermined similarity threshold.

Concept (l) The computer-implemented method of concept (a), wherein the segmentation comprises: clustering segments according to element; and concatenating some or all of the clustered segments; and wherein the segments clustered according to element comprise one or more events performed with respect to a particular element of a user interface implemented via the computing device.

Concept (m) The computer-implemented method of concept (a), wherein the clustering comprises: defining a set k of subsequence pairs from among the one or more individual traces, each subsequence pair being characterized by a distance di between two respective subsequences forming the subsequence pair, and wherein the distances di are of lesser magnitude than a distance between any given subsequence in the set k and any other subsequence among the one or more individual traces; and generating an initial clustering of the set k of subsequence pairs, wherein each cluster of the initial clustering comprises one of the subsequence pairs in the set k.

Concept (n) The computer-implemented method of concept (m), further comprising: updating the initial clustering by iteratively adding one or more additional subsequences to the initial clusters using a nearest-neighbor joining approach, wherein each additional subsequence added to a given initial cluster according to the nearest-neighbor joining approach is characterized by a distance between the additional subsequence and at least one member of the given cluster having a magnitude less than a distance between the additional subsequence and any other subsequence in the set k.

Concept (o) The computer-implemented method of concept (a), wherein the segmenting comprises splitting the concatenated event streams into a plurality of application traces, each application trace comprising a sequence of one or more events performed within a same application, and the method further comprising: clustering the plurality of application traces according to the sequence of the one or more events performed within each respective application trace; and labeling each of the plurality of application traces to form a plurality of sequences of labels, wherein the labeling is performed according to the cluster to which the respective application trace is assigned.

Concept (p) The computer-implemented method of concept (o), wherein each application trace consists of a sequence of one or more events performed with respect to a given element of a user interface used to facilitate the user interacting with the computing device.

Concept (q) The computer-implemented method of concept (a), wherein the segmenting comprises splitting the concatenated event streams into a plurality of application traces, each application trace comprising a sequence of one or more events performed within a same application, and the method further comprising: clustering the plurality of application traces according to the sequence of the one or more events performed within each respective application trace; and labeling each of the plurality of application traces to form a plurality of sequences of labels, wherein the labeling is performed according to the cluster to which the respective application trace is assigned; determining a maximum task length T from among the concatenated event streams, wherein the maximum task length T is a maximum number of events in any of the concatenated event streams; and identifying a set m of recurring subsequences of events based at least in part on labels assigned to application traces corresponding to the subsequences of events, and wherein each recurring subsequence in the set m is characterized by a length less than or equal to the maximum task length T.

Concept (r) The computer-implemented method of concept (q), wherein the set m of recurring subsequences excludes all subsequences belonging to a longer, previously identified recurring subsequence in the set m.

Concept (s) The computer-implemented method of concept (q), wherein determining the maximum task length T comprises: searching, within the clustered traces, for one or more recurring subsequences characterized by a length greater than or equal to a predefined window length $N_i$; incrementing the predefined window length $N_i$ by a predetermined amount to obtain an updated window length $N_{i+1}$; searching, within the clustered traces, for one or more recurring subsequences characterized by a length greater than or equal to the updated window length; in response to identifying, within the clustered traces, one or more recurring subsequences characterized by a length greater than or equal to the updated window length, iteratively repeating the incrementing and the searching until no recurring subsequences characterized by a length greater than or equal to the updated window length are identified in within the clustered traces; and in response to not identifying, within the clustered traces, any recurring subsequences characterized by a length greater than or equal to the updated window length, defining the maximum task length T according to the largest value of the updated window length for which one or more recurring subsequences were identified.

Concept (t) The computer-implemented method of concept (s), wherein each incrementing of the window length doubles the value of the window length utilized in a previous iteration of the searching.

Concept (u) The computer-implemented method of concept (s), wherein identifying the set m of recurring subsequences from among the labeled, clustered traces comprises: searching, within the clustered traces, for one or more recurring subsequences characterized by a length equal to the maximum task length T; flagging the one or more recurring subsequences for inclusion in the set m; decrementing T by a predetermined amount to obtain an updated task length $T_i$; searching, within the clustered traces, for one or more recurring subsequences characterized by a length greater than or equal to the updated task length $T_i$; in response to identifying, within the clustered traces, the one or more recurring subsequences characterized by the length greater than or equal to the updated task length $T_i$, determining whether any of the one or more recurring subsequences characterized by the length greater than or equal to the updated task length $T_i$ corresponds to one of the flagged recurring subsequences; in response to determining one or more of the recurring subsequences characterized by the length greater than or equal to the updated task length $T_i$ correspond to one of the flagged recurring subsequences, ignoring the one or more recurring subsequences; and in response to determining one or more of the recurring subsequences characterized by the length greater than or equal to the updated task length $T_i$ does not correspond to one of the flagged recurring subsequences, flagging the one or more recurring subsequences for addition to the set m; iteratively repeating the decrementing of T, the searching within the clustered traces for recurring subsequences of length greater than or equal to the updated task length $T_i$, and the determining whether one or more of the recurring subsequences characterized by the length greater than or equal to the updated task length $T_i$ correspond to one of the flagged recurring subsequences until $T_i$ has a value less than or equal to a predefined minimum window length; and adding all flagged recurring subsequences to the set m.

While various implementations have been described above, it should be understood that they have been presented by way of example only, and not limitation. Thus, the breadth and scope of a preferred approach should not be limited by any of the above-described exemplary implementations, but should be defined only in accordance with the following claims and their equivalents.

What is claimed is:

1. A computer-implemented method of identifying one or more processes for robotic automation (RPA), the method comprising:
recording a plurality of event streams, each event stream corresponding to a human user interacting with a computing device to perform one or more tasks;
concatenating the event streams;
segmenting some or all of the concatenated event streams to generate one or more application traces performed by the user interacting with the computing device, wherein each application trace corresponds to one of the one or more tasks performed by the user, and wherein at least some of the application traces are implemented at an element level of a single application used by the user to perform the one of the one or more tasks;
clustering the application traces according to a task type;
identifying, from among some or all of the clustered application traces, one or more candidate processes for robotic automation;
prioritizing the candidate processes; and
selecting at least one of the prioritized candidate processes for robotic automation.

2. The method as recited in claim 1, wherein each application trace independently corresponds to either: a host interface, a host service, or an application running on the computing device.

3. The method as recited in claim 1, wherein at least some of the plurality of event streams include task(s) performed by the human user using a plurality of applications.

4. The method as recited in claim 1, wherein each application trace independently represents a maximal segment of events performed within a single application.

5. The method as recited in claim 1, wherein the one or more application traces comprise a plurality of the application traces, and wherein the plurality of application traces comprise a plurality of variants of the one or more tasks.

6. The method as recited in claim 1, wherein some or all of the clusters independently comprise a plurality of application traces that independently represent different instances of successfully performing a same one of the one or more tasks.

7. The method as recited in claim 6, wherein the some or all of the clusters independently further comprise one or more traces independently comprising events performed using a plurality of applications.

8. The method as recited in claim 1, wherein some or all of the application traces independently comprise a plurality of subtraces.

9. The method as recited in claim 8, wherein at least some of the subtraces are implemented at the element level of a single application used by the user to perform the one of the one or more tasks.

10. The method as recited in claim 1, wherein each of the application traces does not cross boundaries of other of the application traces.

11. A computer program product for identifying one or more processes for robotic automation (RPA), comprising: a computer readable storage medium having embodied therewith program instructions configured to cause a hardware processor, upon execution of the program instructions, to perform a method comprising:
recording a plurality of event streams, each event stream corresponding to a human user interacting with a computing device to perform one or more tasks;
concatenating the event streams;
segmenting some or all of the concatenated event streams to generate one or more individual traces performed by the user interacting with the computing device, each trace corresponding to a particular task;
clustering the traces according to a task type;
identifying, from among some or all of the clustered traces, one or more candidate processes for robotic automation;
prioritizing at least one of the candidate processes; and
generating a software robot configured to automate the at least one of the prioritized candidate processes, wherein generating the software robot comprises:
generating a directed, acyclic graph (DAG) representing traces of the at least one prioritized, candidate process; and
identifying a minimum-weight, maximum-frequency path from an initial node of the DAG to a final node of the DAG.

12. The computer program product of claim 11, comprising program instructions configured to cause the hardware processor to generate, based on the plurality of event streams, a data structure representing a user interface (UI) hierarchy associated with each event in each recorded event stream.

13. The computer program product of claim 11, wherein concatenating the event streams comprises: parsing the event streams; and organizing each event stream according to individual events thereof.

14. The computer program product of claim 11, wherein the plurality of event streams exclude predetermined delineators between events and/or tasks represented in the plurality of event streams; and wherein recording the plurality of event streams excludes use and/or insertion of any form of predetermined delineators between the events and/or tasks represented in the plurality of event streams.

15. The computer program product of claim 11, wherein the segmenting comprises identifying one or more task boundaries within a given one of the concatenated event streams using a longest repeating sequence of events occurring within the given one of the concatenated event streams.

16. The computer program product of claim 11, wherein the segmenting comprises generating one or more subtraces performed by the user interacting with the computing device, wherein each subtrace corresponds to: a particular application; a particular element of a user interface; a process invoked on the computing device; and/or combinations thereof.

17. The computer program product of claim 11, wherein the segmentation comprises clustering portions of the concatenated event streams according to elements of a user interface invoked by the human user interacting with the computing device to perform the one or more tasks.

18. The computer program product of claim 11, wherein the clustering comprises:
generating a distance matrix comprising a plurality of distances between longest common substrings within pairs of subsequences represented in the traces;
generating a distance image based on the distance matrix, wherein an intensity of each pixel in the distance image indicates a distance between the longest common substring of a given pair of the subsequences represented in the traces;
converting the distance image to a binary image;
defining one or more line segments within the binary image, wherein each line segment indicates a series of pairs of subsequences represented in the traces and characterized by a maximum distance therebetween; and
grouping line segments characterized by common vertical coordinates within the binary image.

19. The computer program product of claim 11, wherein at least the recording, the concatenating, the segmenting, the clustering, the identifying, and the prioritizing are automated processes excluding human input and human interaction with the computer.

20. A computer-implemented method of identifying one or more processes for robotic automation (RPA), the method comprising:
recording a plurality of event streams, each event stream corresponding to a human user interacting with a computing device to perform one or more tasks;
concatenating the event streams;
segmenting some or all of the concatenated event streams to generate one or more application traces performed by the user interacting with the computing device, wherein each application trace corresponds to one of the one or more tasks performed by the user, and wherein each application trace independently represents a maximal segment of events performed within a single application;
clustering the application traces according to a task type;
identifying, from among some or all of the clustered application traces, one or more candidate processes for robotic automation;
prioritizing the candidate processes; and
selecting at least one of the prioritized candidate processes for robotic automation.

* * * * *